US008746995B2

(12) United States Patent
Okutani

(10) Patent No.: US 8,746,995 B2
(45) Date of Patent: Jun. 10, 2014

(54) CAMERA

(75) Inventor: Tsuyoshi Okutani, Machida (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/477,927

(22) Filed: May 22, 2012

(65) Prior Publication Data
US 2012/0281134 A1 Nov. 8, 2012

Related U.S. Application Data

(63) Continuation of application No. 13/067,757, filed on Jun. 23, 2011, now abandoned, which is a continuation of application No. 12/461,823, filed on Aug. 25, 2009, now abandoned.

(30) Foreign Application Priority Data

Aug. 26, 2008 (JP) ................................. 2008-216575

(51) Int. Cl.
G03B 9/08 (2006.01)
(52) U.S. Cl.
USPC ......................................................... 396/466
(58) Field of Classification Search
USPC .......................................... 396/466; 348/362
See application file for complete search history.

(56) References Cited

U.S. PATENT DOCUMENTS

| 4,410,256 A | 10/1983 | Sato et al. | |
|---|---|---|---|
| 5,253,004 A | 10/1993 | Umetsu et al. | |
| 5,266,993 A | 11/1993 | Uematsu | |
| 5,361,110 A | 11/1994 | Haraguchi | |
| 5,848,312 A * | 12/1998 | Kitazawa et al. | ............. 396/535 |
| 7,344,321 B2 * | 3/2008 | Nakagawa | ..................... 396/443 |
| 7,384,204 B2 | 6/2008 | Uematsu et al. | ............... 396/358 |
| 7,445,393 B2 | 11/2008 | Yamagami | ..................... 396/443 |

(Continued)

FOREIGN PATENT DOCUMENTS

| JP | 05-127223 A | 5/1993 |
|---|---|---|
| JP | 2002-202546 A | 7/2002 |

(Continued)

OTHER PUBLICATIONS

European Search Report dated Dec. 29, 2009, issued in corresponding European Patent Application 09168749.1.

(Continued)

*Primary Examiner* — Rochelle-Ann J Blackman
*Assistant Examiner* — Linda B Smith
(74) *Attorney, Agent, or Firm* — Staas & Halsey LLP

(57) ABSTRACT

In a camera, a first cam is rotated to assume a rotational phase at which drive of a first shutter blade set with a first drive force is not hindered and a second drive force charge cam face in contact with a second charge member charges a second drive force as a rotating shaft is caused to rotate to a first rotational phase. A second drive force charge cam in contact with the second charge member sustains a second drive force charging state period in which the shaft in the first rotational phase rotates to a second rotational phase. A first drive force charge cam face in contact with the first charge member charges the first drive force and the second cam face in contact with the second charge member charges the second drive force as the shaft rotates from the first rotational phase to the second rotational phase.

9 Claims, 18 Drawing Sheets

(56) References Cited

U.S. PATENT DOCUMENTS

| | | |
|---|---|---|
| 2004/0076422 A1 | 4/2004 | Toyoda .................. 396/452 |
| 2007/0053683 A1 | 3/2007 | Fujikawa |
| 2008/0151093 A1* | 6/2008 | Wakikawa et al. ....... 348/333.01 |
| 2008/0175583 A1 | 7/2008 | Seita ..................... 396/357 |
| 2008/0187304 A1 | 8/2008 | Hirose .................. 396/260 |
| 2009/0028545 A1 | 1/2009 | Sakai et al. ............ 396/480 |
| 2009/0097839 A1 | 4/2009 | Iwase ................... 358/396 |
| 2010/0322615 A1 | 12/2010 | Misawa ................. 396/358 |
| 2012/0141107 A1* | 6/2012 | Inukai .................. 396/358 |

FOREIGN PATENT DOCUMENTS

| | | |
|---|---|---|
| JP | 2005-292526 | 10/2005 |
| JP | 2006-153988 A | 6/2006 |
| JP | 2006-208704 A | 8/2006 |
| JP | 2007-312197 | 11/2007 |
| JP | 2008-11358 | 1/2008 |
| JP | 2008-96606 | 4/2008 |

OTHER PUBLICATIONS

Office Action mailed from the United States Patent and Trademark Office on Dec. 23, 2010 in the related U.S. Appl. No. 12/461,823.
Office Action mailed from the United States Patent and Trademark Office on Nov. 22, 2011 in the related U.S. Appl. No. 13/067,757.
U.S. Appl. No. 13/067,757, filed Jun. 23, 2011, Tsuyoshi Okutani, Nikon Corporation.
U.S. Appl. No. 12/461,823, filed Aug. 25, 2009, Tsuyoshi Okutani, Nikon Corporation.

* cited by examiner

CAMERA

CROSS-REFERENCE TO RELATED APPLICATIONS

This application is a continuation of and claims priority benefit to U.S. patent application Ser. No. 13/067,757, filed Jun. 23, 2011 now abandoned, which is a continuation of U.S. patent application Ser. No. 12/461,823, filed Aug. 25, 2009, abandoned, which application in turn is based upon and claims the benefit of priority under 35 U.S.C. §119 to Japanese Patent Application No. 2008-216575 filed Aug. 26, 2008, the entire contents of which are incorporated herein by reference.

BACKGROUND OF THE INVENTION

1. Field of the Invention

The present invention relates to a technology for camera operation control.

2. Description of Related Art

Japanese Laid Open Patent Publication No. H5-127223 discloses a single-lens reflex camera. As the shutter release button is pressed, a mirror moves out of the photographic optical path and the shutter curtains run. The subject light is guided to an image sensor or a silver halide film over a predetermined length of time and a subject image is captured in the shutter open state.

In the camera described above, in which the individual operational steps, starting with the photographing start and ending with the completion of the reset operation, are executed through a single operational sequence, the front curtain and the rear curtain cannot be controlled independently of each other. For instance, the front curtain of the shutter cannot be run or charged by itself.

SUMMARY OF THE INVENTION

A camera according to a first aspect of the present invention comprises: an image sensor that captures a subject image; a first shutter blade set and a second shutter blade set that open/close to assume an open state in which the subject image is guided to the image sensor or a closed state in which the image sensor is shielded; a first charge member that charges a first drive force used to drive the first shutter blade set; a second charge member that charges a second drive force used to drive the second shutter blade set; a first cam having formed therein a first drive force charge cam face that comes in contact with the first charge member to displace the first charge member along a charging direction so as to charge the first drive force; a second cam having formed therein a second drive force charge cam face that comes in contact with the second charge member to displace the second charge member along the charging direction so as to charge the second drive force; a third cam having formed therein a cam face so as to drive a mirror between a down position assumed within a photographic optical path in order to guide the subject image to a viewfinder and an up position assumed out of the photographic optical path to guide the subject image to the image sensor; and a rotating shaft with the first cam, the second cam and the third cam fixed thereupon, that causes the first through third cams to rotate as one, wherein: the first cam is rotated to assume a rotational phase at which drive of the first shutter blade set with the first drive force is not hindered and the second drive force charge cam face in contact with the second charge member charges the second drive force as the rotating shaft is caused to rotate to a first rotational phase; the second drive force charge cam in contact with the second charge member sustains a second drive force charging state during a transition period in which the rotating shaft in the first rotational phase rotates to a second rotational phase; and the first drive force charge cam face in contact with the first charge member charges the first drive force and the second drive force charge cam face in contact with the second charge member charges the second drive force as the rotating shaft is caused to rotate from the first rotational phase to the second rotational phase.

According to a second aspect of the present invention, in the camera according to the first aspect, it is preferable that, as the rotating shaft in the first rotational phase is caused to rotate to a third rotational phase, the first cam is rotated to assume a rotational phase at which the drive of the first shutter blade set with the first drive force is not hindered and the second cam is rotated to assume a rotational phase at which drive of the second shutter blade set with the second drive force is not hindered; and that, during a transition period in which the rotating shaft in the third rotational phase rotates to the first rotational phase, the first cam is not rotated to a rotational phase at which the drive of the first shutter blade set with the first drive force is hindered and the second drive force charge cam face contacts the second charge member so as to gradually charge the second drive force.

According to a third aspect of the present invention, in the camera according to the first or second aspect, it is preferable that, as the rotating shaft is caused to rotate to assume a fourth rotational phase, the first drive force charge cam face in contact with the first charge member charges the first drive force and the second drive force charge cam face in contact with the second charge member charges the second drive force; that, during a transition period in which the rotating shaft in the fourth rotational phase rotates to a fifth rotational phase, the first drive force charge cam face moves away from the first charge member so as to allow the first charge member to move along a direction opposite from the charging direction and the second drive force charge cam face moves away from the second charge member so as to allow the second charge member to move along the direction opposite from the charging direction; that, as the rotating shaft is caused to rotate to the fifth rotational phase, the first cam is rotated to assume a rotational phase at which the drive of the first shutter blade set with the first drive force is not hindered and the second cam is rotated to assume a rotational phase at which the drive of the second shutter blade set with the second drive force is not hindered; and that, during a transition period in which the rotating shaft in the fifth rotational phase rotates to the fourth rotational phase, the first drive force charge cam face in contact with the first charge member gradually displaces the first charge member along the charging direction and the second drive force charge cam face in contact with the second charge member gradually displaces the second charge member along the charging direction.

According to a fourth aspect of the present invention, in the camera according to the second aspect, it is preferable that, as the rotating shaft is caused to rotate to a fourth rotational phase, the first drive force charge cam face in contact with the first charge member charges the first drive force and the second drive force charge cam face in contact with the second charge member charges the second drive force; that, during a transition period in which the rotating shaft in the fourth rotational phase rotates to a fifth rotational phase, the first drive force charge cam face moves away from the first charge member so as to allow the first charge member to move along a direction opposite from the charging direction and the second drive force charge cam face moves away from the second charge member so as to allow the second charge member to move along the direction opposite from the charging direction; that, as the rotating shaft is caused to rotate to the fifth rotational phase, the first cam is rotated to assume a rotational phase at which the drive of the first shutter blade set with the first drive force is not hindered and the second cam is rotated to assume a rotational phase at which the drive of the second shutter blade set with the second drive force is not hindered; that, during a transition period in which the rotating shaft in the fifth rotational phase rotates to the fourth rotational phase, the first drive force charge cam face in contact with the first charge member gradually displaces the first charge member along the charging direction and the second drive force charge cam face in contact with the second charge member gradually displaces the second charge member along the charging direction; and that, the fifth rotational phase is equivalent to the third rotational phase.

According to a fifth aspect of the present invention, in the camera according to the first through fourth aspect, it is preferable that the second rotational phase includes a sixth rotational phase and a seventh rotational phase; that, during a transition period in which the rotating shaft in the sixth rotational phase rotates to the seventh rotational phase, the third cam drives the mirror in the down position to the up position; that, during a transition period in which the rotating shaft in the seventh rotational phase rotates to the sixth rotational phase, the third cam drives the mirror assuming the up position to the down position; that, as the rotating shaft is caused to rotate to the sixth rotational phase, the third cam is rotated to assume a rotational phase at which the mirror is set in the down position; and that, as the rotating shaft is caused to rotate to the seventh rotational phase, the third cam is rotated to assume a rotational phase at which the mirror is set in the up position.

According to a sixth aspect of the present invention, the camera according to the third or fourth aspect may further comprises: a first holding device that includes a first coil and holds the first shutter blade set charged with the first drive force so as to disallow drive of the first shutter blade set with the first drive force as power is supplied to the first coil; a second holding device that includes a second coil and holds the second shutter blade set charged with the second drive force so as to disallow drive of the second shutter blade set with the second drive force as power is supplied to the second coil; and a coil control device that controls power supply to the first coil and power supply to the second coil, and it is preferable that, during the transition period in which the rotating shaft in the fourth rotational phase rotates to the fifth rotational phase, the coil control device supplies power to the first coil so as to ensure the first shutter blade set is not driven with the first drive force and supplies power to the second coil so as to ensure that the second shutter blade set is not driven with the second drive force.

According to a seventh aspect of the present invention, in the camera according to the sixth aspect, it is preferable that when the rotating shaft is caused to rotate to the first rotational phase, the coil control device does not supply power to the first coil or the second coil.

According to a eighth aspect of the present invention, the camera according to the second aspect may further comprises: an imaging control device that controls an imaging operation executed by the image sensor to capture a subject image, and it is preferable that the imaging control device enables the image sensor to capture a subject image as the rotating shaft rotates to the third rotational phase.

According to a ninth aspect of the present invention, the camera according to the third aspect may further comprise an imaging control device that controls an imaging operation executed by the image sensor to capture a subject image, and it is preferable that the imaging control device enables the image sensor to capture a subject image as the rotating shaft rotates to the fifth rotational phase.

DESCRIPTION OF PREFERRED EMBODIMENTS

Figure 1A:
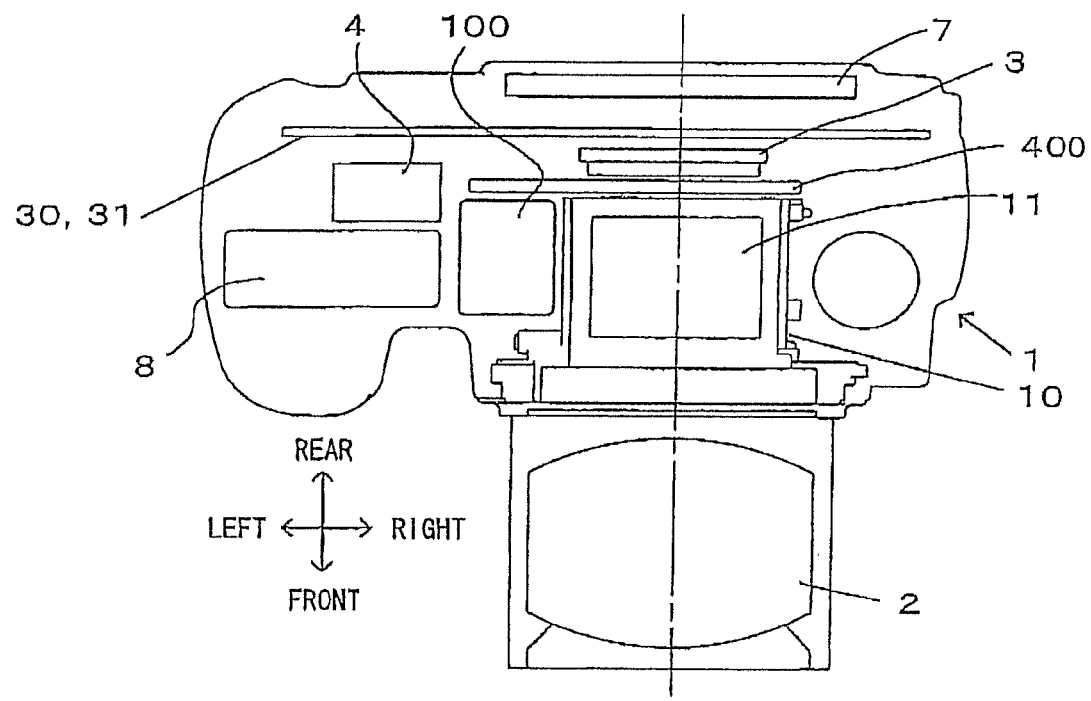
FIGS. 1A and 1B each present a sectional view of the camera body.
Figure 1B:
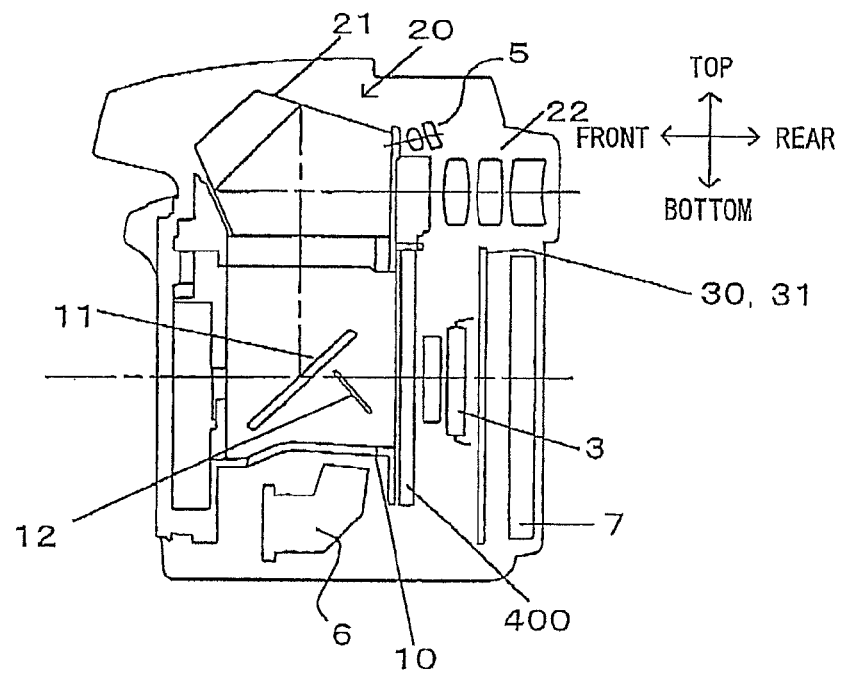

In reference to FIGS. 1 through 18, an embodiment of the camera according to the present invention is described. FIG. 1A is a sectional view of a camera body 1 of the single-lens reflex camera achieved in the embodiment, taken from above. FIG. 1B is a sectional view of the camera body 1 taken from the side. At the camera body 1, a mirror box 10, a sequence shutter drive unit 100, a shielding curtain mechanism 400, an image sensor 3, a sequence motor 4, a viewfinder optical system 20, a photometering unit 5, an AF unit 6, a rear-side display monitor 7 and a control substrate 30 are disposed. Reference numeral 8 indicates a battery loaded in the camera body 1. A photographic lens 2 is mounted at the front side of the camera body 1. The following description is given by defining the top side, the bottom side, the left side, the right side, the front side and the rear side of the camera body 1, as indicated in the relevant figures.

A photographic optical path is formed with the mirror box 10, which houses a main mirror 11 and a sub-mirror 12. The mirror box 10 is installed in the camera body 1. The sequence shutter drive unit 100 is a drive mechanism that drives an aperture mechanism, a mirror rotation mechanism, and a front curtain shielding blade set and a rear curtain shielding blade set of the shielding curtain mechanism 400 to be described later. The sequence shutter drive unit 100 is to be described in detail later. The shielding curtain mechanism 400, which includes the front curtain shielding blade set and the rear curtain shielding blade set, is a device that opens and shields the photographic opening over a specific length of time. The shielding curtain mechanism 400 is to be described in detail later.

The image sensor 3, constituted with a solid-state image sensor such as a CCD sensor or a CMOS sensor, converts the subject image formed through the photographic lens 2 to electrical signals. The sequence motor 4 is a drive source that generates a drive force for the sequence shutter drive unit 100. Through the viewfinder optical system 20, which includes a pentaprism 21 and an eyepiece lens 22, an image (subject image) formed with the subject light reflected from the main mirror 11 can be observed. The photometering unit 5 is a CCD unit engaged in photometering operation by using the subject light departing the pentaprism 21. The AF unit 6 is engaged in focus detection by using the subject light input thereto via the main mirror 11 and the sub-mirror 12.

At the rear-side display monitor 7, which may be, for instance, a liquid crystal display device, various types of information related to the ongoing photographing operation, an image of a subject having been captured, a through image (may be referred to as a live view image or a live preview image) and the like are displayed. It is to be noted that the term "through image" is used to refer to a preliminary photographic image that is repeatedly obtained at the image sensor 3 during a preliminary stage preceding the main photographing operation. The main photographing operation is executed in response to an operation signal (photographing instruction) output as the shutter release button (not shown) is pressed all the way down. The control substrate 30 is the substrate upon which a control circuit 31 that controls the entire camera body 1 is mounted.

Figure 2:
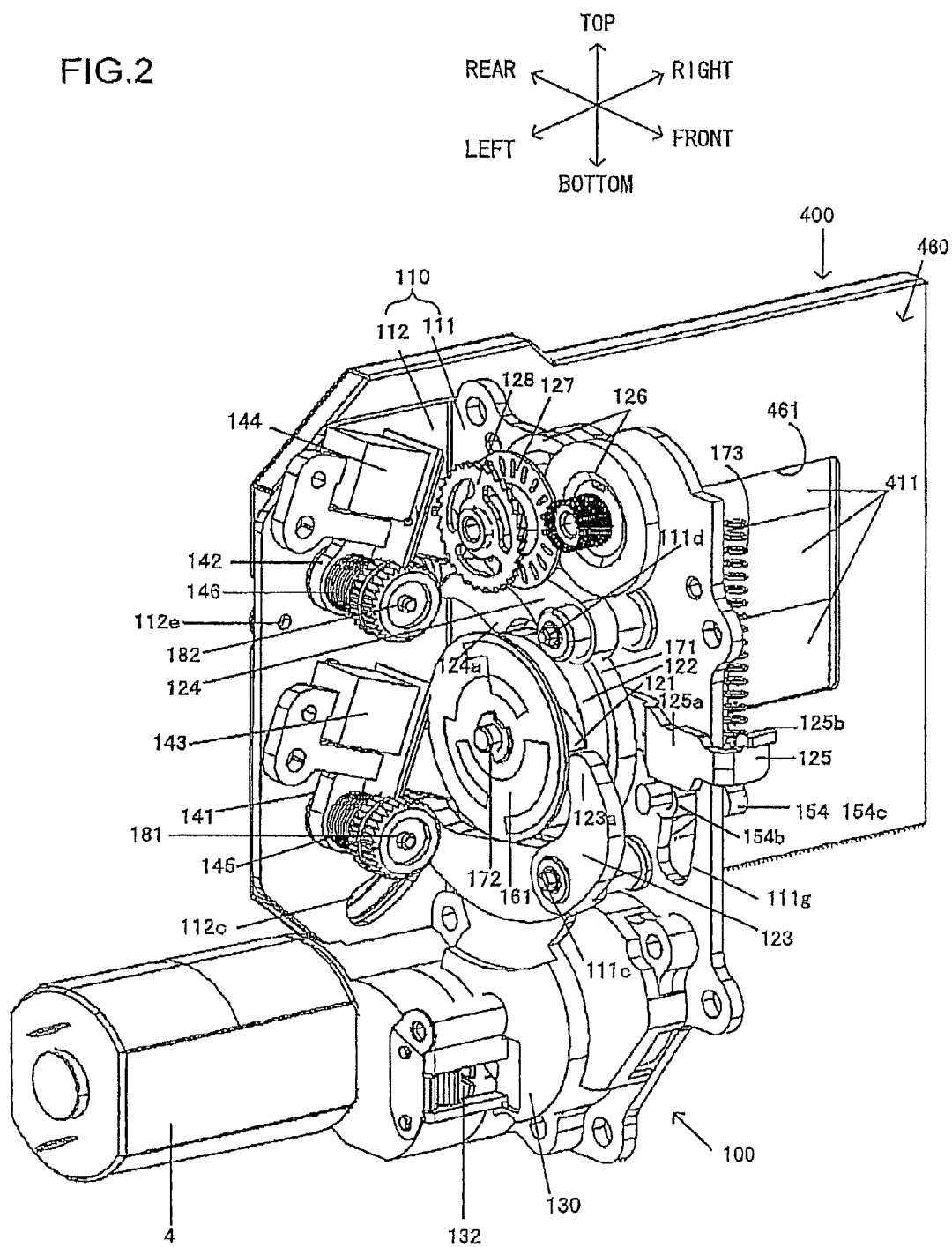
FIG. 2 is a perspective of the sequence shutter drive unit and the shielding curtain mechanism, viewed from the front/left side along a diagonal direction.
Figure 3:
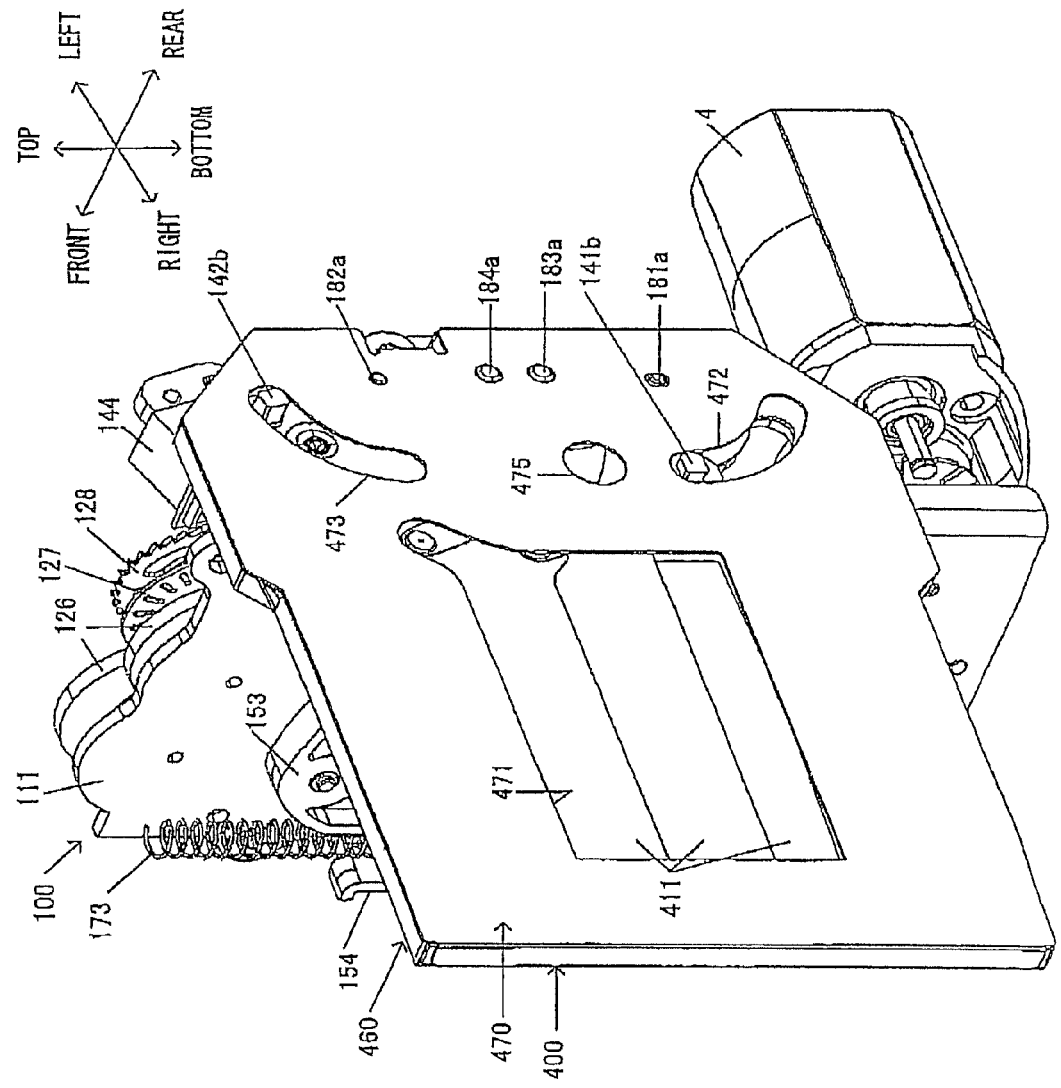
FIG. 3 is a perspective of the sequence shutter drive unit and the shielding curtain mechanism, viewed from the rear/right side along a diagonal direction.
Figure 4:
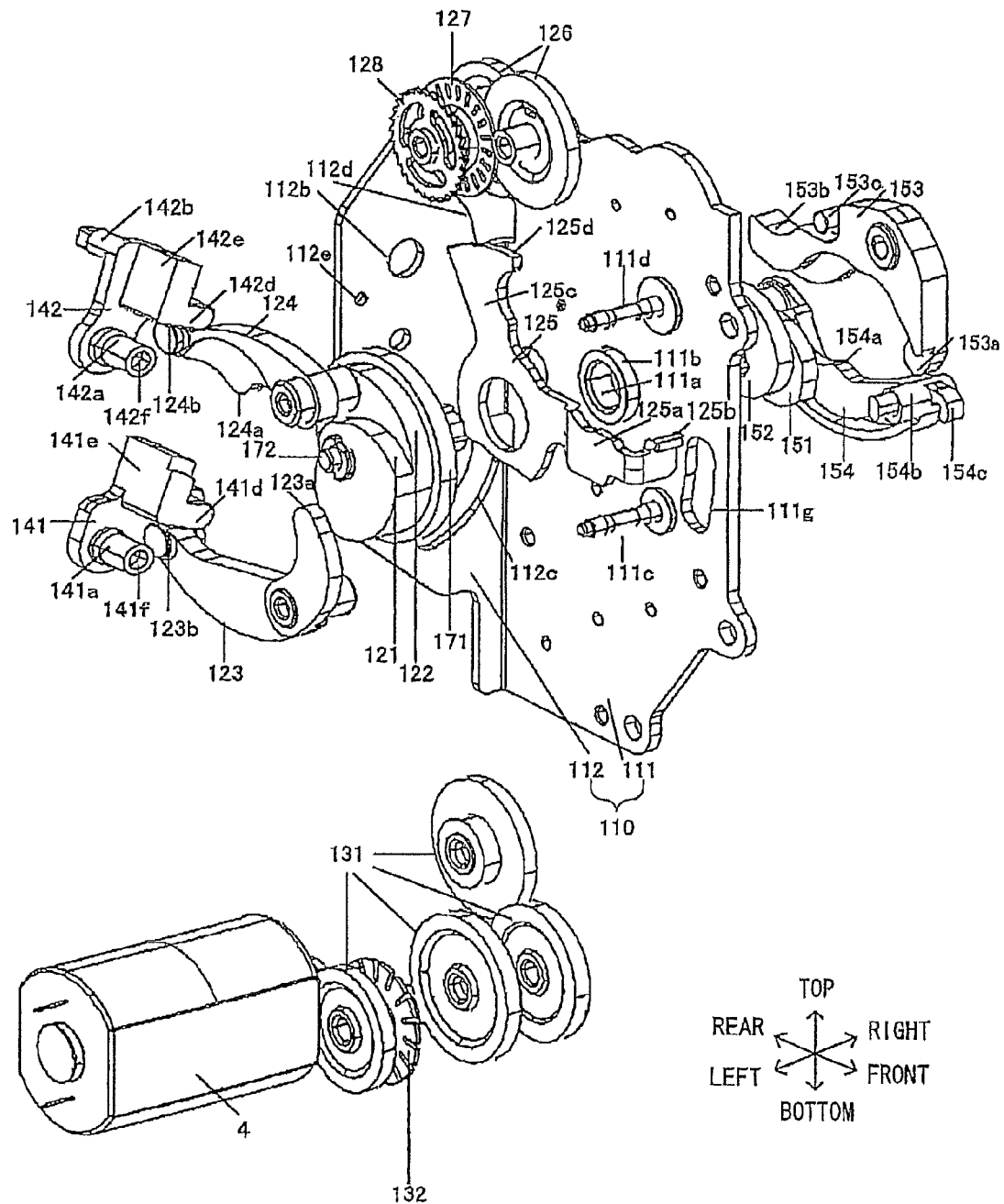
FIG. 4 shows part of the sequence shutter drive unit in an exploded view.
Figure 5:
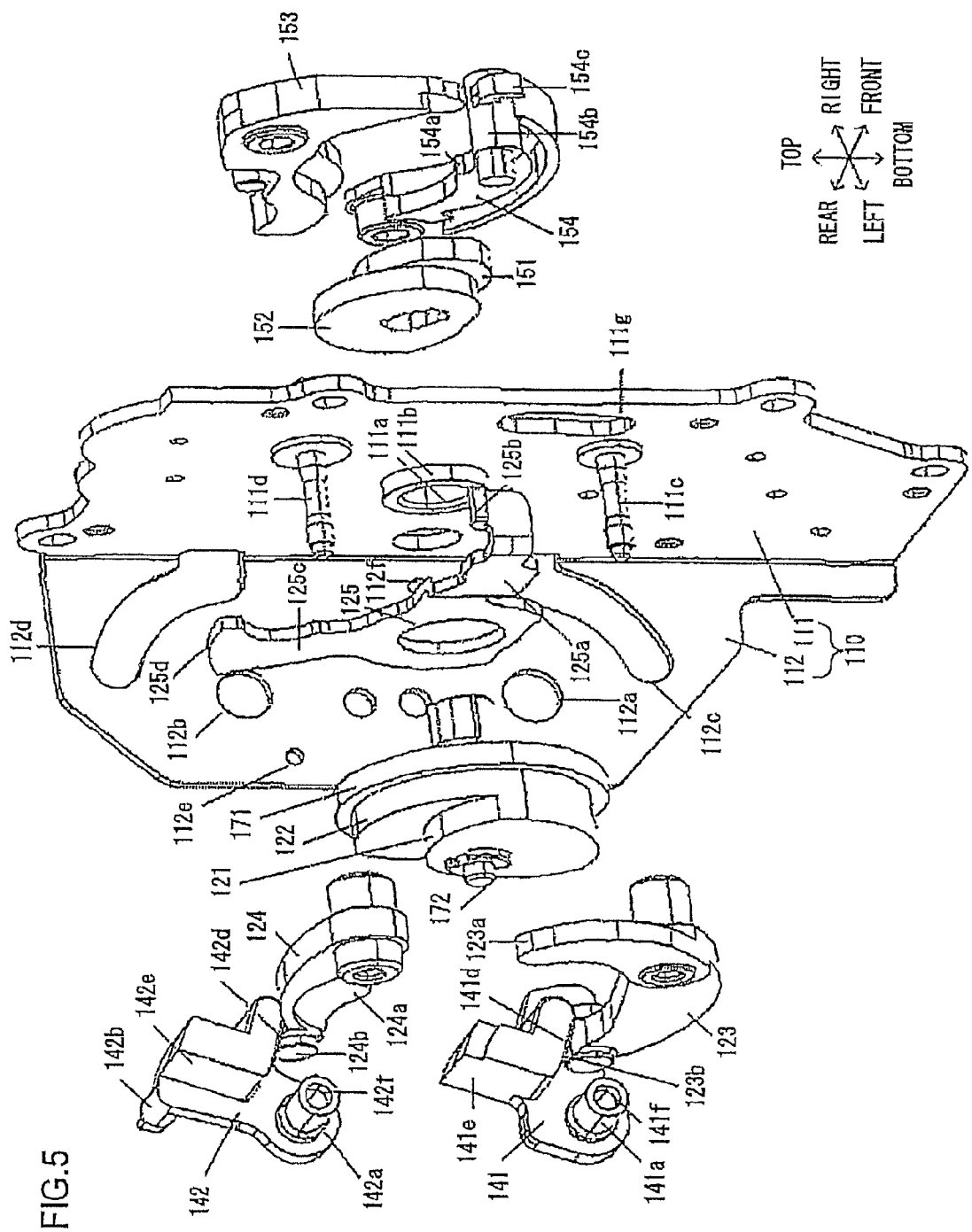
FIG. 5 shows part of the sequence shutter drive unit in an exploded view.
Figure 6:
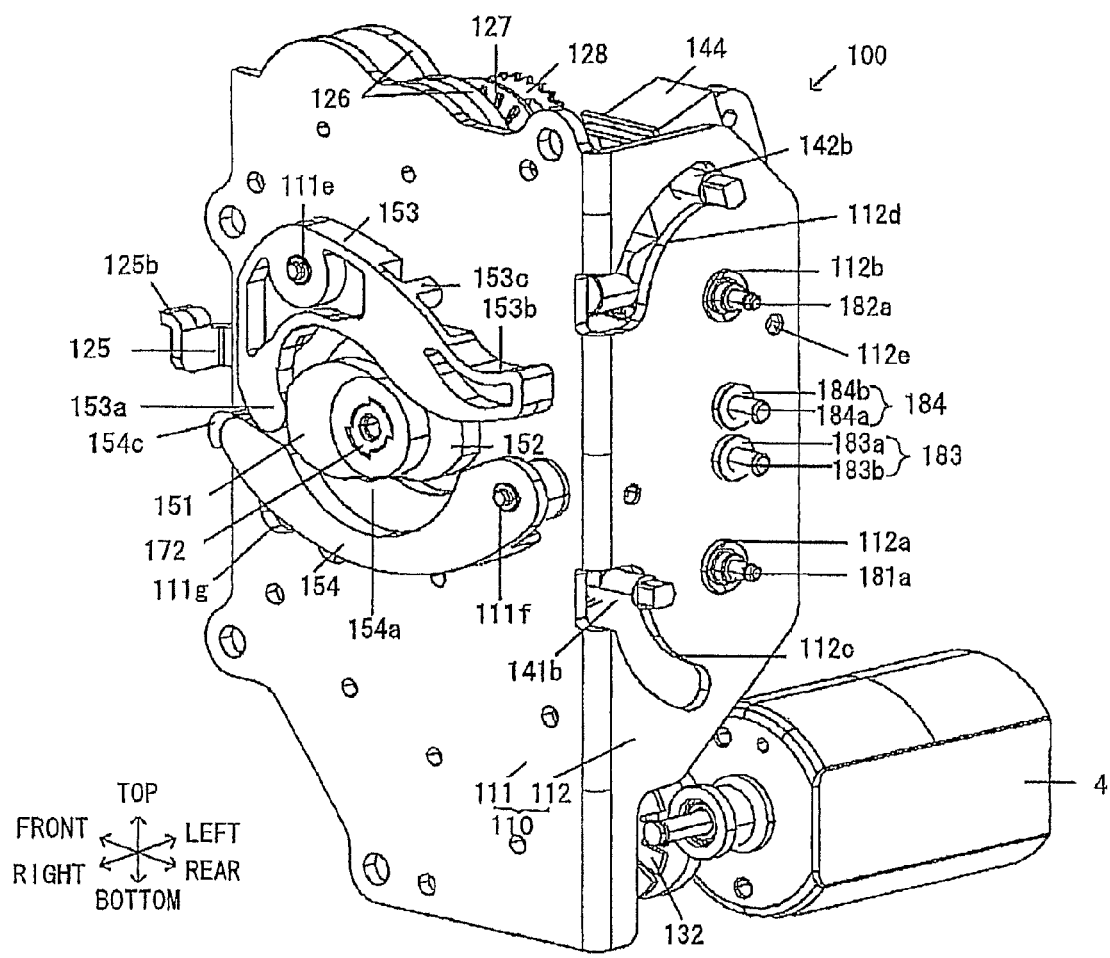
FIG. 6 shows the sequence shutter drive unit viewed from the rear/right side along a diagonal direction.

FIG. 2 is a perspective of the sequence shutter drive unit 100 and the shielding curtain mechanism 400 viewed from the front/left side along a diagonal direction, whereas FIG. 3 is a perspective of the sequence shutter drive unit 100 and the shielding curtain mechanism 400 viewed from the rear/right side along a diagonal direction. FIGS. 4 and 5 each show part of the sequence shutter drive unit 100 in an exploded view. FIG. 6 shows the sequence shutter drive unit 100 viewed from the rear/right side along a diagonal direction. The following description of the structures adopted in the various units is given by assuming that they are all in a pre-photographing start (a pre-shutter release operation start) state.

Sequence Shutter Drive Unit 100

The sequence shutter drive unit 100 includes various cams, levers and gears disposed on a sequencing base plate set 110. The sequencing base plate set 110 includes a first base plate 111 and a second base plate 112 ranging substantially perpendicular to each other with the first base plate 111 and the second base plate 112 forming a substantially L-shape viewed from above.

The first base plate 111 ranges along the direction running toward the front/rear of the camera body 1 and along the direction running toward the top/bottom of the camera body 1. A front curtain charge cam 121, a rear curtain charge cam 122, a front curtain charge cam lever 123, a rear curtain charge cam lever 124, an aperture control lever 125, an aperture control gear 126, an encoder gear 127, a ratchet gear 128, a speed-reducing gear unit 130 and a cam code substrate 161 are disposed at the left side surface of the first base plate 111. A mirror drive cam 151, an aperture control lever drive cam 152, a mirror drive cam lever 153 and an aperture control lever drive cam lever 154 are disposed at the right side surface of the first base plate 111 (see FIG. 6).

The second base plate 112 ranges along the direction running toward the left/right sides of the camera body 1 and along the direction running toward the top/bottom of the camera body 1. At the front surface of the second base plate 112, a front curtain drive lever 141, a rear curtain drive lever 142, a front curtain magnet 143 and a rear curtain magnet 144 are disposed. A front curtain follower arm support pin 183 and a rear curtain follower arm support pin 184 are implanted at the rear surface of the second base plate 112 (see FIG. 6). Screw holes 112e and 112f at which a front case 460 and a rear cover 470 of the shielding curtain mechanism 400 to be described later are locked via screws, are formed in the second base plate 112. It is to be noted that the second base plate 112 ranges to the left from the rear end of the first base plate 111.

The sequencing base plate set 110 is manufactured with a specific required level of precision by using a material with sufficient rigidity, in order to ensure that the various components can be mounted at the correct installation positions at the first base plate 111 and the second base plate 112 and that any movable component moves with the required level of precision by moving through a specific locus and stopping at a specific stop position. The right side surface of the first base plate 111 in the sequencing base plate set 110 is attached to the left side surface of the mirror box 10. In addition, the shielding mechanism 400 is attached to the rear surface of the second base plate 112 in the sequencing base plate set 110. It is to be noted that the overall sequencing base plate set 110 may be regarded as a plate locked onto the mirror box 10 at which the drive mechanism for the main mirror 11 is disposed.

The front curtain charge cam 121 drives the front curtain drive lever 141 to be described later, so as to charge the front curtain shielding blade set to be detailed later, i.e., so as to charge the drive force to be used to drive the front curtain shielding blade set. The rear curtain charge cam 122 drives the rear curtain drive lever 142 to be described later, so as to charge the rear curtain shielding blade set to be detailed later, i.e., so as to charge the drive force to be used to drive the rear curtain shielding blade set. The front curtain charge cam 121 and the rear curtain charge cam 122 are formed so as to constitute an integrated unit together with a cam gear 171, with a rotating shaft (cam shaft 172) attached thereto (see FIGS. 4 and 5). As the cam shaft 172, inserted through a shaft support hole 111a formed in the first base plate 111, is rotatably supported via the shaft support hole, the front curtain charge cam 121 and the rear curtain charge cam 122 both become rotatably supported so that they are allowed to rotate relative to the first base plate 111. In addition, since the cam gear 171 interlocks with the low-speed side gear in a speed-reducing gear train 131 in the speed-reducing gear unit 130 to be detailed later, the front curtain charge cam 121 and the rear curtain charge cam 122 are caused to rotate with the drive force from the sequence motor 4, transmitted thereto via the speed-reducing gear unit 130.

It is to be noted that the cam faces of the charge cams 121 and 122 are both formed in shapes that allow them to drive the corresponding drive levers 141 and 142 regardless of which direction the cam shaft 172 rotates. The cam faces of the charge cams 121 and 122 are also formed so as to disallow any displacement of the drive levers 141 and 142 due to inertia, by an extent exceeding that corresponding to the displacement attributable to the cams.

The front charge cam lever 123 is driven by the front curtain charge cam 121 and includes a cam contact portion 123a and a front curtain drive lever contact portion 123b (see FIGS. 4 and 5). The front curtain charge cam lever 123 is a charge member used to charge the drive force used to drive the front curtain shielding blade set. The cam contact portion 123a comes in contact with the cam face of the front curtain charge cam 121. The front curtain drive lever contact portion 123b comes in contact with the front curtain drive lever 141 to be detailed later. A force is applied from a low-load spring (not shown) to the front curtain charge cam lever 123, which is rotatably supported by a shaft 111c implanted at the left side surface of the first base plate 111, so that its displacement occurs in conformance to the movement of the front curtain charge cam 121 via the cam contact portion 123a in contact with the cam face of the front curtain charge cam 121.

The rear charge cam lever 124 is driven by the rear curtain charge cam 122 and includes a cam contact portion 124a and a rear curtain drive lever contact portion 124b (see FIGS. 4 and 5). The rear curtain charge cam lever 124 is a charge member used to charge the drive force used to drive the rear curtain shielding blade set. The cam contact portion 124a comes in contact with the cam face of the rear curtain charge cam 122. The rear curtain drive lever contact portion 124b comes in contact with the rear curtain drive lever 142 to be detailed later. A force is applied from a low-load spring (not shown) to the rear curtain charge cam lever 124, which is rotatably supported by a shaft 111d implanted at the left side surface of the first base plate 111, so that it moves in conformance to the movement of the rear curtain charge cam 122 via the cam contact portion 124a in contact with the cam face of the rear curtain charge cam 122.

The aperture control lever 125 is rotatably supported at the shaft support hole 111a formed in the first base plate 111 and a shaft 111b coaxial to the shaft support hole 111a so as to rotate around the shaft support hole 111a and the shaft 111b. The aperture control lever 125 is a member that controls the aperture at the photographic lens 2. The aperture control lever 125 includes an arm 125a ranging to the front, a contact portion 125b, an arm 125c ranging upward and a fan-shaped gear portion 125d (see FIGS. 4 and 5). As explained later, the aperture control lever 125 is linked via a spring (not shown) to the aperture control lever drive cam lever 154 and a downward force is applied from the spring (not shown) to the arm 125a so that the lower end of the arm 125a comes in contact with the aperture control lever drive cam lever 154. The downward rotation of the arm 125a of the aperture control lever 125 is regulated with the lower end of the arm 125a set in contact with the aperture control lever drive cam lever 154. The contact portion 125b, formed at the front end of the arm 125a, comes in contact with a lens-side aperture lever (not shown) at the photographic lens 2 mounted at the camera body 1.

The fan-shaped gear portion 125d, disposed at the front end of the arm 125c to range along a circular arc centered on the shaft 111b, interlocks with the input-side (low-speed side) gear in the aperture control gear 126 to be detailed later.

The aperture control gear 126 is a gear train that amplifies the extent of rotation of the aperture control lever 125. As mentioned above, the input-side (low-speed side) gear in the aperture control gear 126 interlocks with the fan-shaped gear portion 125d of the aperture control lever 125. The encoder gear 127 and the ratchet gear 128 are attached to the output-side (high-speed side) gear in the aperture control gear 126. A plurality of slits (pinholes) are formed over equal intervals along the circumferential direction at the encoder gear 127, with a photo-interrupter (not shown) disposed so as to enclose the encoder gear 127. As the aperture control lever 125 rotates along the constricting direction, the rotation quantity, i.e., the extent of rotation is increased by the aperture control gear 126 and the on-off signals (pulse signals) corresponding to the position of the detected small hole at the encoder gear 127, are output from the photo-interrupter to the control circuit 31. Namely, the rotation quantity indicating the extent to which the aperture control lever 125 has rotated can be detected based upon the number of pulses output as the pulse signals from the photo-interrupter.

The ratchet gear 128 includes a ratchet portion formed at the outer circumferential area thereof, which is allowed to engage with a tab of a holding lever (not shown).

The speed-reducing gear unit 130, which includes the speed-reducing gear train 131 and an encoder gear 132, decelerates the drive force imparted from the sequence motor 4 and transmits the decelerated drive force to the cam gear 171 (see FIG. 4). The speed-reducing gear unit 130 is locked onto the first base plate 111 with screws. The encoder gear 132 is attached to the input-side (low-speed side) gear in the speed-reducing gear train 131. A plurality of slits similar to those at the encoder gear 127 mentioned earlier, are formed over equal intervals along the circumferential direction at the encoder gear 132, with a photo-interrupter (not shown) disposed so as to enclose the encoder gear 132. As the sequence motor 4 is driven, on-off signals (pulse signals) corresponding to the position of the small hole at the encoder gear 132, are output from the photo-interrupter to the control circuit 31. Namely, the rotation quantity indicating the extent to which the sequence motor 4 has rotated can be detected based upon the number of pulses output as the pulse signals from the photo-interrupter.

The cam code substrate 161, which is disposed at the cam shaft 172, rotates as one with the front curtain charge cam 121, the rear curtain charge cam 122, the mirror drive cam 151 and the aperture control lever drive cam 152, the latter two of which are to be described in detail later. Electrode patterns are formed at the left side surface of the cam code substrate 161 and brushes (not shown) are placed in contact with the electrode pattern. The states of electrical continuity between the electrode patterns contacting the brushes change as the cam code substrate 161 rotates and, accordingly, the phases of the individual cams can be detected by detecting whether or not the electrode patterns are electrically continuous.

More specifically, three switches are configured by the electrode patterns and the brushes (not shown) at the cam code substrate 161. The three switches are each turned on to connect a ground line (not shown) with a detection terminal and are each turned off to disconnect the ground line (not shown) from the detection terminal. The on-off states of the switches shift individually in correspondence to the rotational phase of the cam shaft 172. Accordingly, the phases of the individual cams can be determined based upon the current combination of the on-off states assumed by the three switches, i.e., based upon the current combination of the grounding conditions at the detection terminals (not shown). The relationship of the on-off states of the three switches to the rotational phase of the cam shaft 172 (i.e., the phases of the individual cams) is to be described later.

The front curtain drive lever 141 drives a front curtain shielding blade set 411 in the shielding curtain mechanism 400 to be described in detail later. The front curtain drive lever 141 includes a hollow shaft portion 141a, the front curtain drive lever projecting portion 141b, a contact portion 141d and a magnetically attracted portion 141e (see FIGS. 4, 5 and 6), and is rotatably attached so as to rotate relative to the second base plate 112.

The hollow shaft portion 141a is a hollow shaft implanted at one end of the front curtain drive lever 141 at the front surface thereof so as to range to the front. The front curtain drive lever projecting portion 141b is a shaft-like portion implanted at the other end of the front curtain drive lever 141 at the rear surface thereof so as to range to the rear. The front end of the front curtain drive lever projecting portion is set into an engaging hole 421b formed at a front curtain main arm 421 at the front curtain shielding blade set 411 to be detailed later. It is to be noted that an elongated hole 112c is formed in the second base plate 112 so as to allow the front curtain drive lever projecting portion 141b ranging beyond the rear surface of the second base plate 112 to be engaged in the engaging hole 421b at the front curtain main arm 421 and also to allow the front curtain drive lever projecting portion 141b to move unhindered as the front curtain drive lever 141 rotates.

The contact portion 141d, located at the other end of the front surface of the front curtain drive lever 141, comes in contact with the front curtain drive lever contact portion 123b of the front curtain charge cam lever 123. The magnetically attracted portion 141e, located at the front surface of the front curtain drive lever 141, is attracted toward the front curtain magnet 143 to be described later.

A through hole 141f, ranging from the front end surface through the rear end surface of the hollow shaft portion 141a, is formed at the front curtain drive lever 141 (see FIGS. 4 and 5). A front curtain drive lever holding pin 181 locked onto the second base plate 112 is inserted through the through hole 141f. As a result, the front curtain drive lever 141 is rotatably supported by the front curtain drive lever holding pin 181 and, at the same time, its displacement along the up/down direction and the left/right direction is regulated. In addition, the rearward displacement of the front curtain drive lever 141 is regulated by the second base plate 112 and with the front curtain drive lever holding pin 181 holding fast the front curtain drive lever 141, the frontward displacement of the front curtain drive lever is also regulated. A spring 145 applies a force to the front curtain drive lever 141 along the clockwise direction, centered on the central axis of the hollow shaft portion 141a as the front curtain drive lever 141 is viewed from the front.

The rear curtain drive lever 142 drives a rear curtain shielding blade set 431 in the shielding curtain mechanism 400 to be described in detail later. The rear curtain drive lever 142 includes a hollow shaft portion 142a, a rear curtain drive lever projecting portion 142b, a contact portion 142d and a magnetically attracted portion 142e (see FIGS. 4, 5 and 6), and is rotatably attached so as to rotate relative to the second base plate 112.

The hollow shaft portion 142a is a hollow shaft implanted at one end of the rear curtain drive lever 142 at the front surface thereof so as to range to the front. The rear curtain drive lever projecting portion 142b is a shaft-like portion implanted at the other end of the rear curtain drive lever 142 at the rear surface thereof so as to range to the rear. The front end of the front end drive lever projecting portion is set into an engaging hole 441b formed at a rear curtain main arm 441 at the rear curtain shielding blade set 431. It is to be noted that an elongated hole 112d is formed in the second base plate 112 so as to allow the rear curtain drive lever projecting portion 142b ranging beyond the rear surface of the second base plate 112 to be engaged in the engaging hole 441b at the rear curtain main arm 441 and also to allow the rear curtain drive lever projecting portion 142b to move unhindered as the rear curtain drive lever 142 rotates.

The contact portion 142d, located at the front surface of the rear curtain drive lever 142, comes in contact with the rear curtain drive lever contact portion 124b of the rear curtain charge cam lever 124. The magnetically attracted portion 142e, located at the front surface of the rear curtain drive lever 142, is attracted toward the rear curtain magnet 144 to be described later.

A through hole 142f, ranging from the front end surface through the rear end surface of the hollow shaft portion 142a, is formed at the rear curtain drive lever 142 (see FIGS. 4 and 5). A rear curtain drive lever holding pin 182 locked onto the second base plate 112 is inserted through the through hole 142f. As a result, the rear curtain drive lever 141 is rotatably supported by the rear curtain drive lever holding pin 182 and, at the same time, its displacement along the up/down direction and the left/right direction is regulated. In addition, the rearward displacement of the rear curtain drive lever 142 is regulated by the second base plate 112 and with the rear curtain drive lever holding pin 182 holding fast the rear curtain drive lever 142, the frontward displacement of the rear curtain drive lever is also regulated. A Spring 146 applies a force to the rear curtain drive lever 142 along the clockwise direction, centered on the central axis of the hollow shaft portion 142a as the rear curtain drive lever 142 is viewed from the front.

The front curtain drive lever 141, the rear curtain drive lever 142 and the springs 145 and 146 constitute a shutter blade drive mechanism that drives the shutter blades, i.e., the front curtain shielding blade set 411 and the rear curtain shielding blade set 431.

As power is supplied to an exciting coil, the front curtain magnet 143 attracts and holds the magnetically attracted portion 141e of the front curtain drive lever 141 in contact. It is to be noted that as the power supply to the exciting coil stops, the front curtain magnet 143 detachably releases the magnetically attracted portion 141e.

As power is supplied to an exciting coil, the rear curtain magnet 144 attracts and holds the magnetically attracted portion 142e of the rear curtain drive lever 142 in contact. It is to be noted that as the power supply to the exciting coil stops, the rear curtain magnet 144 detachably releases the magnetically attracted portion 142e.

The front curtain follower arm support pin 183, which is a staged shaft-like member implanted at the rear surface of the second base plate 112, includes a small diameter portion 183a located on the rear side and a large diameter portion 183b located on the front side. As explained later, the front curtain follower arm support pin 183 rotatably supports a front curtain follower arm 422 in the shielding curtain mechanism 400. The rear curtain follower arm support pin 184, which is a staged shaft-like member implanted at the rear surface of the second base plate 112, includes a small diameter portion 184a located on the rear side and a large diameter portion 184b located on the front side. As explained later, the rear curtain follower arm support pin 184 rotatably supports a rear curtain follower arm 442 in the shielding curtain mechanism 400.

The mirror drive cam 151 drives the mirror drive cam lever 153 to be described later. The aperture control lever drive cam 152 drives the aperture control lever drive cam lever 154 to be described later. The mirror drive cam 151 and the aperture control lever drive cam 152 are formed as an integrated unit attached to the cam shaft 172 (see FIGS. 4, 5 and 6). Since the cam shaft 172 inserted through the shaft support hole 111a at the first base plate 111 is rotatably supported as explained earlier, the mirror drive cam 151 and the aperture control lever drive cam 152 are rotatably supported so as to rotate relative to the first base plate 111. In addition, since the cam gear 171 interlocks with the low-speed side gear in the speed-reducing gear train 131 of the speed-reducing gear unit 130, the mirror drive cam 151 and the aperture control lever drive cam 152 are caused to rotate together with the front curtain charge cam 121 and the rear curtain charge cam 122 described earlier by the drive force originating from the sequence motor 4, which is transmitted via the speed-reducing gear unit 130.

It is to be noted that the drive cams 151 and 152 are similar to the charge cams 121 and 122 in that the cam faces of the drive cams 151 and 152 are both formed in shapes that allow them to drive the corresponding drive cam levers 153 and 154 regardless of which direction the cam shaft 172 rotates. The cam faces of the drive cams 151 and 152 are also formed so as to disallow any displacement of the drive cam levers 153 and 154 due to inertia, by an extent exceeding that corresponding to the displacement attributable to the cams.

Figure 7:
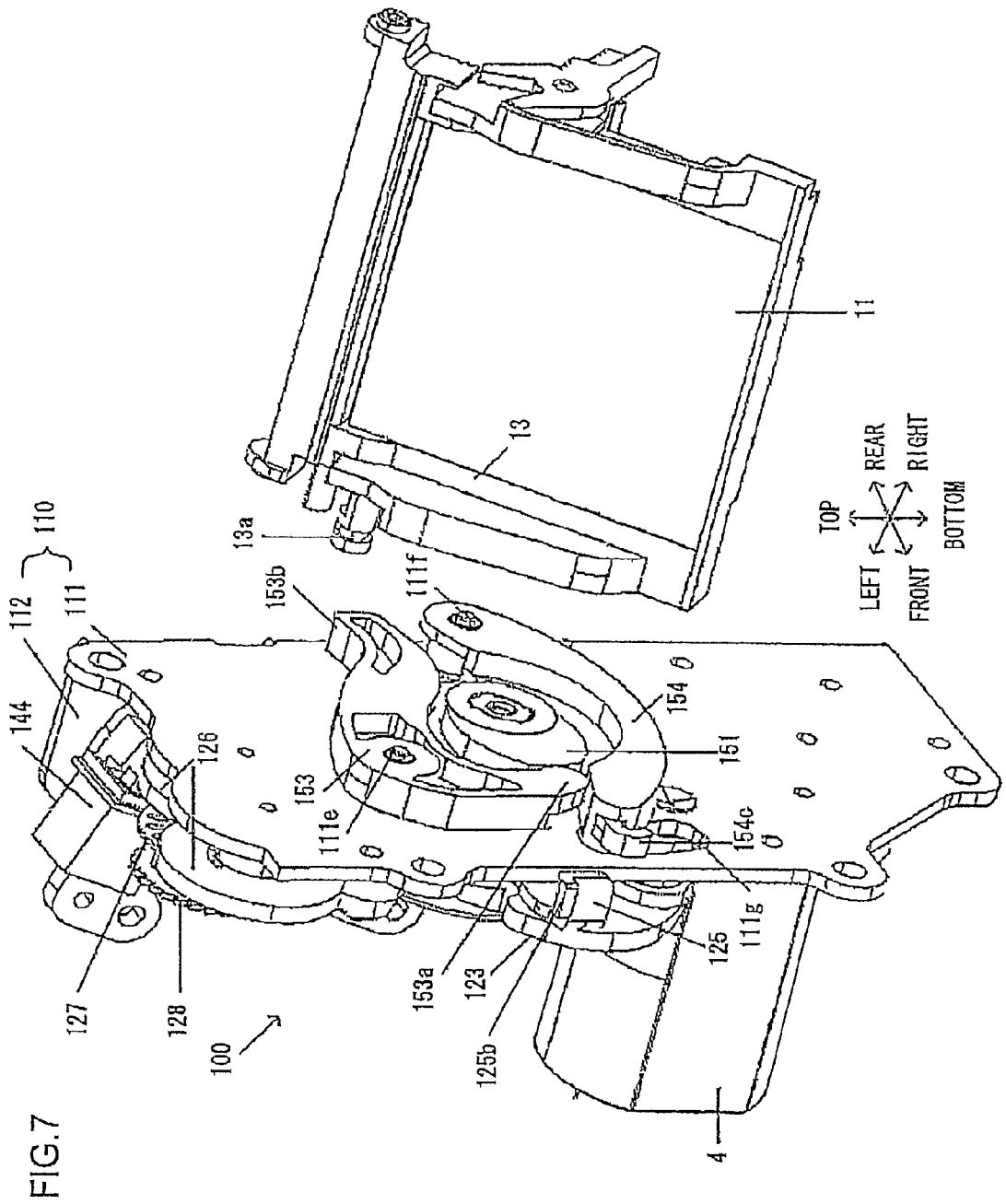
FIG. 7 shows the sequence shutter drive unit and the main mirror viewed from the rear/right side along a diagonal direction.

The mirror drive cam lever 153, which is driven by the mirror drive cam 151, includes a cam contact portion 153a, a mirror drive shaft contact portion 153b and a spring holding portion 153c (see FIGS. 4, 5 and 6). The cam contact portion 153a comes in contact with the cam face of the mirror drive cam 151. The mirror drive shaft contact portion 153b comes in contact with a pin 13a ranging to the left of a main mirror holding frame 13 holding the main mirror 11 and pushes up the pin, as illustrated in FIG. 7. The spring holding portion 153c holds one end of a main mirror drive spring (not shown). It is to be noted that the other end of the main mirror drive spring (not shown) is held at the right side surface of the first base plate 111.

The mirror drive cam lever 153 is rotatably supported by a shaft 111e implanted at the right side surface of the first base plate 111 (see FIGS. 6 and 7). It is to be noted that a force imparted from the main mirror drive spring (not shown) is applied to the mirror drive cam lever 153 along the counter-clockwise direction centered on the shaft 111e, viewed from the right side of the camera body 1. In other words, the force imparted from the main mirror drive spring (not shown) is applied to the mirror drive cam lever 153 so that its displacement occurs in conformance to the movement of the mirror drive cam 151 via the cam contact portion 153a in contact with the cam face of the mirror drive cam 151. It is to be noted that the mirror drive cam lever 153 may be regarded as a main mirror drive lever that drives the main mirror 11 reciprocally.

The aperture control lever drive cam lever 154, which is driven by the aperture control lever drive cam 152, includes a cam contact portion 154a, an aperture control lever contact portion 154b and a spring holding portion 154c (see FIGS. 4~7). One end of the aperture control lever drive cam lever 154 is rotatably supported at a shaft 111f implanted at the right side surface of the first base plate 111 (see FIGS. 6 and 7).

The cam contact portion 154a at the other end of the aperture control lever drive cam lever 154 comes in contact with the cam face of the aperture control lever drive cam 152.

The aperture control lever contact portion 154b is a shaft-like portion implanted at the left side surface at the other end of the aperture control lever drive cam lever 154 and as it comes in contact with the lower end of the arm 125a of the aperture control lever 125, it lifts up the arm. The aperture control lever contact portion 154b is linked with the arm 125a of the aperture control lever 125 via a spring (not shown). It is to be noted that an elongated hole 111g is formed at the first base plate 111 so as to ensure that the aperture control lever contact portion 154b projecting out beyond the left side surface of the first base plate 111 is allowed to come in contact with the lower end of the arm 125a of the aperture control lever 125 and that the aperture control lever contact portion 154b is allowed to move unhindered as the aperture control lever drive cam lever 154 rotates.

One end of a spring (aperture release spring) 174 is held at the spring holding portion 154c (see FIG. 2). It is to be noted that the other end of the aperture release spring 173 is held at the right side surface of the first base plate 111. The force imparted from the aperture release spring 173 is applied to the aperture control lever drive cam lever 154 along the clockwise direction centered on the shaft 111f, viewed from the right side of the camera body 1. In other words, the force imparted from the aperture release spring 173 is applied to the aperture control lever drive cam lever 154 so that the cam contact portion 154a comes into contact with and follows the cam face of the aperture control lever drive cam 152 and that the aperture control lever contact portion 154b in contact with the lower end of the arm 125a of the aperture control lever 125 pushes up the arm.

Shielding Curtain Mechanism 400

Figure 8:
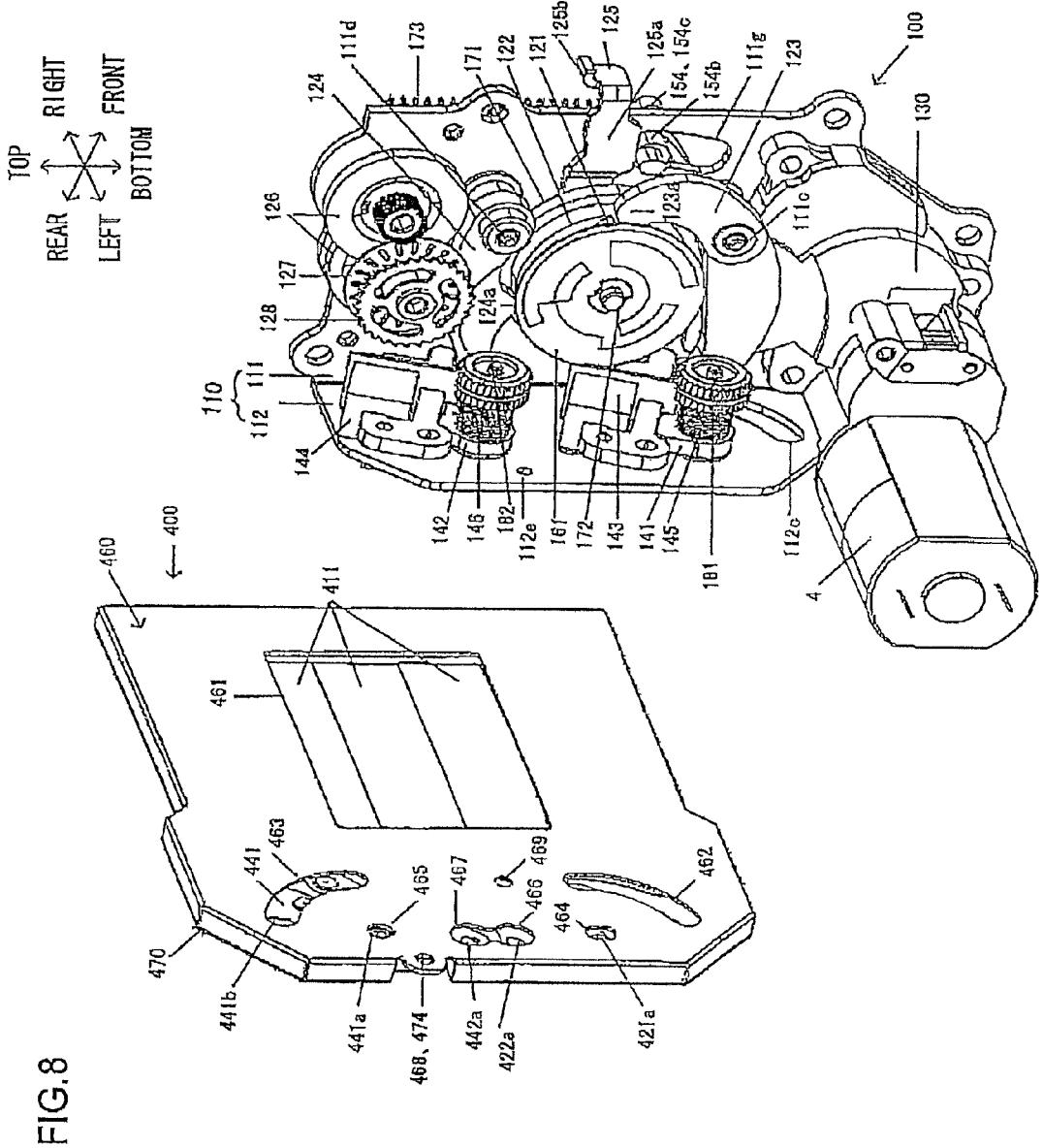
FIG. 8 is a perspective of the sequence shutter drive unit and the shielding curtain mechanism disengaged from each other, viewed from the front/left side along a diagonal direction.
Figure 9:
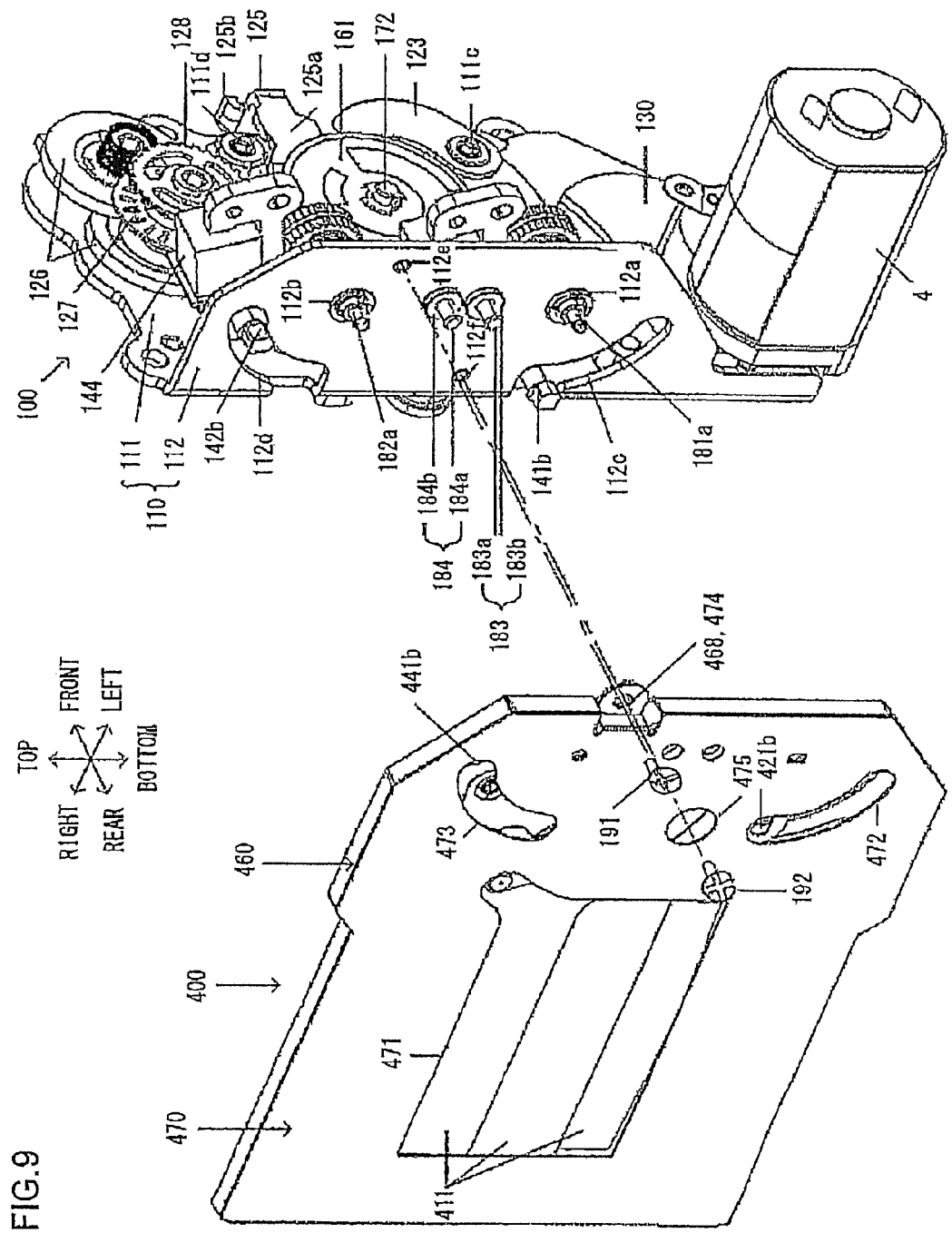
FIG. 9 is a perspective of the sequence shutter drive unit and the shielding curtain mechanism disengaged from each other, viewed from the rear/left side along a diagonal direction.
Figure 10:
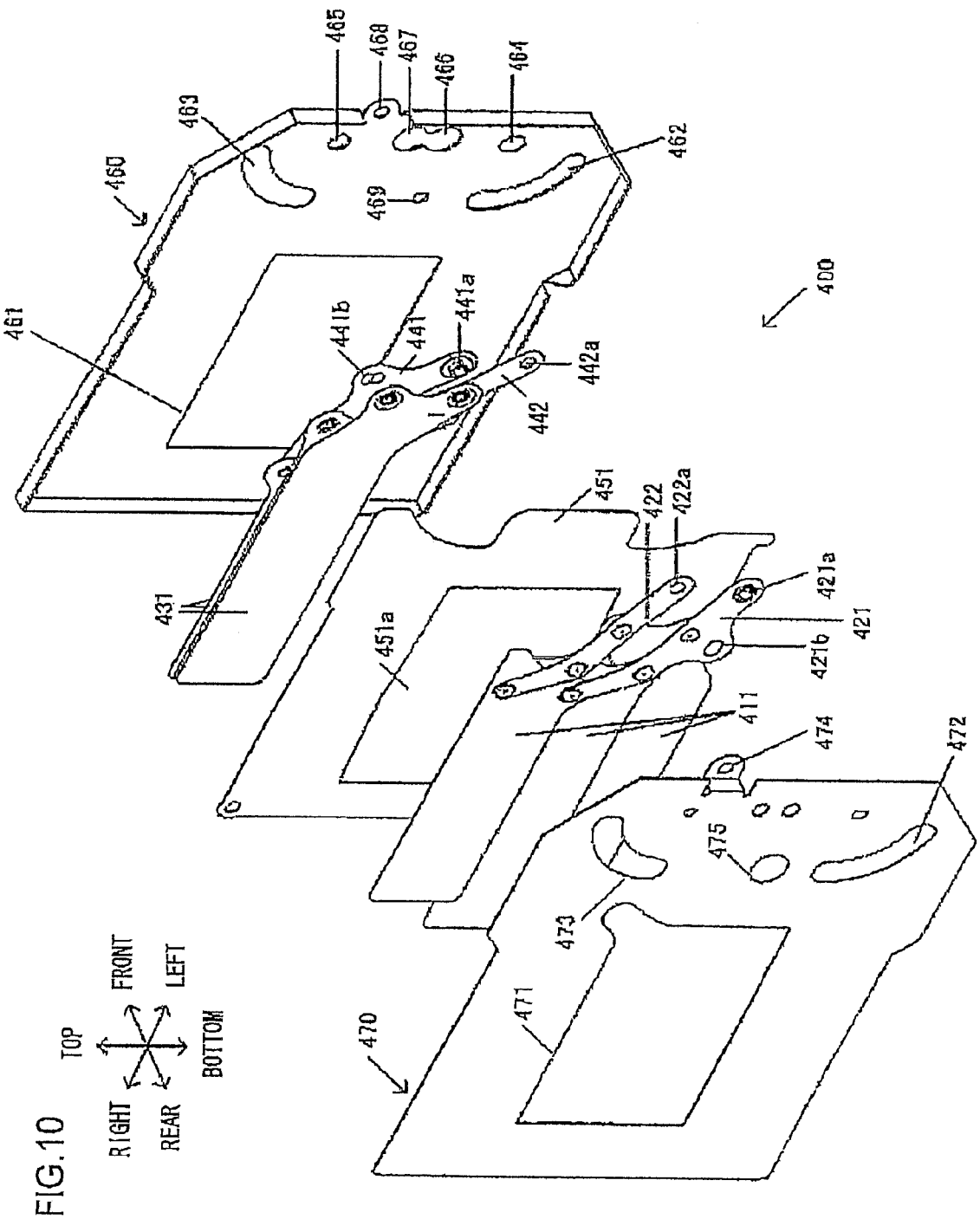
FIG. 10 is an exploded view of the shielding curtain mechanism.

FIG. 8 is a perspective of the sequence shutter drive unit 100 and the shielding curtain mechanism 400 detached from each other, viewed from the front/left side along a diagonal direction. FIG. 9 is a perspective of the sequence shutter drive unit 100 and the shielding curtain mechanism 400 detached from each other, viewed from the rear/left side along a diagonal direction. FIG. 10 is an exploded view of the shielding curtain mechanism 400. The shielding curtain mechanism 400 includes the front curtain shielding blade set 411, the front curtain main arm 421, the front curtain follower arm 422, the rear curtain shielding blade set 431, the rear curtain main arm 441, the rear curtain follower arm 442, a partitioning plate 451, a front case 460 and a rear cover 470 (see FIG. 10).

The front curtain shielding blade set 411, constituted with three blades, is a set of shielding blades (shutter blades) that shields and unshields a photographic opening 461 in the front case 460 to be detailed later. The individual blades of the front curtain shielding blade set 411 are all rotatably attached via caulking pins to the front curtain main arm 421 and the front curtain follower arm 422, which drive the front curtain shielding blade set 411. A rotating shaft hole 421a and an engaging hole 421b are formed at the front curtain main arm 421, whereas a rotating shaft hole 422a is formed at the front curtain follower arm 422.

The rear curtain shielding blade set 431, similar to the front curtain shielding blade set 411, constituted with three blades, is a set of shielding blades (shutter blades) that shields and unshields the photographic opening 461. The individual blades of the rear curtain shielding blade set 431 are all rotatably attached via caulking pins to the rear curtain main arm 441 and the rear curtain follower arm 442, which drive the rear curtain shielding blade set 431. A rotating shaft hole 441a and an engaging hole 441b are formed at the rear curtain main arm 441, whereas a rotating shaft hole 442a is formed at the rear curtain follower arm 442.

The partitioning plate 451, which is a member with a function of preventing any interference between the front curtain shielding blade set 411 and the rear curtain shielding blade set 431, includes an opening 451a formed in correspondence to the photographic opening 461.

The front case 460, which houses the front curtain shielding blade set 411 and the rear curtain shielding blade set 431, also has a function of shielding the image sensor 3 from the subject light on the mirror box side. The photographic opening 461, elongated holes 462 and 463, main arm rotating shaft through holes 464 and 465, follower arm rotating shaft through holes 466 and 467 and screw holes 468 and 469 are formed at the front case 460.

The photographic opening 461 is an opening through which the subject light is guided to the image sensor 3. The elongated hole 462, through which the front curtain drive lever projecting portion 141b of the front curtain drive lever 141 is inserted, assumes an elongated shape so as to ensure that the front curtain drive lever projecting portion 141b is allowed to move unhindered as the front curtain drive lever 141 rotates. Likewise, the elongated hole 463, through which the rear curtain drive lever projecting portion 142b of the rear curtain drive lever 142 is inserted, assumes an elongated shape so as to ensure that the rear curtain drive lever projecting portion 142b is allowed to move unhindered as the rear curtain drive lever 142 rotates.

A rear end 181a of the front curtain drive lever holding pin 181 and a rear end 182a of the rear curtain drive lever holding pin 182 are respectively inserted at the main arm rotating shaft through holes 464 and 465. The front curtain follower arm support pin 183 and the rear curtain follower arm support pin 184 are respectively inserted through the follower arm rotating shaft through holes 466 and 467. It is to be noted that the rear ends 181a and 182a of the front curtain drive lever holding pin 181 and the rear curtain drive lever holding pin 182, fixed to the second base plate 112 as described earlier, project out further rearward beyond the second base plate 112 (see FIGS. 6 and 9). Namely, the front curtain drive lever holding pin 181 and the rear curtain drive lever holding pin 182 are fixed onto the second base plate 112 in a state in which they are inserted through the holes 112a and 112b (see FIGS. 4~6 and 9) formed in the second base plate 112.

The screw holes 468 and 469 are through holes via which the front case 460 is attached to the second base plate 112. It is to be noted that through direct contact with the rear curtain shielding blade set 431 or the arms 441 and 442 or via the partitioning plate 451 or the rear cover 470, the front case 460 is subjected to the forces of the traveling shielding blade sets 411 and 431 or the forces of the rotating arms 421, 422, 441 and 442. For this reason, it is desirable to lock the front case 460 onto the second base plate 112 over areas near the arms 421, 422, 441 and 442, i.e., in the vicinity of the points of application of the drive forces to be used to drive the shielding blade sets 411 and 431, which are input to the shielding curtain mechanism 400. Accordingly, the screw holes 468 and 469 are formed near the arms 421, 422, 441 and 442. It is to be noted that screw holes 112e and 112f at the second base plate 112 are formed at positions corresponding to those of the screw holes 468 and 469.

The rear cover 470 is a sheet-type member, which is mounted on the rear side of the front case 460 to close off the rear end of the front case 460. An opening 471 corresponding to the photographic opening 461 in the front case 460, elongated holes 472 and 473 corresponding to the elongated holes 462 and 463 at the front case 460, a screw hole 474 and a front case screw mounting hole 475 are formed at the rear cover 470.

It is to be noted that the screw hole 474 is formed at a position corresponding to the position of the screw hole 468 at the front case 460, so that the rear cover 470 is jointly fastened, together with the front case 460, through the screw hole 112e in the second base plate 112 via a screw 191. In addition, the front case screw mounting hole 475 is formed as a through hole through which a screw 192 can be inserted, so that the front case 460 can be locked via the screw 192 at the screw hole 112f in the second base plate 112 after the rear cover 470 is set in place relative to the front case 460.

It is to be noted that the rear curtain shielding blade set 431 is disposed between the front case 460 and the partitioning plate 451 and the front curtain shielding blade set 411 is disposed between the partitioning plate 451 and the rear cover 470 at the shielding curtain mechanism 400. The front case 460 and the rear cover 470 together form a shielding blade set housing portion, i.e., a shutter blade housing portion.

Before the assembled shielding curtain mechanism 400 is mounted at the sequence shutter drive unit 100, the rotating shaft hole 421a and the engaging hole 421b in the front curtain main arm 421 are respectively positioned to the rear of the main arm rotating shaft through hole 464 and the elongated hole 462 in the front case 460 (see FIGS. 8 and 9). In addition, at the assembled shielding curtain mechanism 400, the rotating shaft hole 422a in the front curtain follower arm 422 is positioned to the rear of the follower arm rotating shaft through hole 466 in the front case 460. Likewise, the rotating shaft hole 441a and the engaging hole 441b in the rear curtain main arm 441 are positioned rearward relative to the main arm rotating shaft through hole 465 and the elongated hole 463 in the front case 460 and the rotating shaft hole 442a in the rear curtain follower arm 442 is positioned rearward relative to the follower arm rotating shaft through hole 467 in the front case 460 in the assembled shielding curtain mechanism 400.

As the shielding curtain mechanism 400 structured as described above is mounted at the sequence shutter drive unit 100, the various parts of the shielding curtain mechanism 400 assume the relationships described in (a) through (f) below with the various parts of the sequence shutter drive unit 100.

(a) The rear end 181a of the front curtain drive lever holding pin 181 is inserted through the main arm rotating shaft through hole 464 in the front case 460 and the rotating shaft hole 421a in the front curtain main arm 421. As a result, the front curtain main arm 421 becomes rotatably supported by the front curtain drive lever holding pin 181.

(b) The front curtain drive lever projecting portion 141b of the front curtain drive lever 141 is inserted through the elongated hole 462 in the front case 460 and the engaging hole 421b in the front curtain main arm 421. As a result, the front curtain drive lever projecting portion 141b at the front curtain drive lever 141 becomes engaged in the engaging hole 421b in the front curtain main arm 421.

(c) The large diameter portion 183b of the front curtain follower arm support pin 183 is inserted through the follower arm rotating shaft through hole 466 and the small diameter portion 183a of the front curtain follower arm support pin 183 is inserted through the rotating shaft hole 422a in the front curtain follower arm 422. As a result, the front curtain follower arm 422 becomes rotatably supported by the front curtain follower arm support pin 183.

(d) The rear end 182a of the rear curtain drive lever holding pin 182 is inserted through the main arm rotating shaft through hole 465 and the rotating shaft hole 441a in the rear curtain main arm 441. As a result, the rear curtain main arm 441 becomes rotatably supported by the rear curtain drive lever holding pin 182.

(e) The rear curtain drive lever projecting portion 142b of the rear curtain drive lever 142 is inserted through the elongated hole 463 in the front case 460 and the engaging hole 441b in the rear curtain main arm 441. As a result, the rear curtain drive lever projecting portion 142b of the rear curtain drive lever 142 becomes engaged in the engaging hole 441b in the rear curtain main arm 441.

(f) The large diameter portion 184b of the rear curtain follower arm support pin 184 is inserted through the follower arm rotating shaft through hole 467 and the small diameter portion 184a of the rear curtain follower arm support pin 184 is inserted through the rotating shaft hole 442a in the rear curtain follower arm 442. As a result, the rear curtain follower arm 442 becomes rotatably supported by the rear curtain follower arm support pin 184.

It is to be noted that as the front case 460 and the rear cover 470 are attached to the second base plate 112 via the screws 191 and 192 as explained earlier, the shielding curtain mechanism 400 is mounted and locked onto the sequence shutter drive unit 100 (see FIG. 9).

Thus, once the shielding curtain mechanism 400 is mounted at the sequence shutter drive unit 100 as described above, the front curtain main arm 421 is rotatably supported by the front curtain drive lever holding pin 181 and the front curtain follower arm 422 is rotatably supported by the front curtain follower arm support pin 183. As the front curtain main arm 421 and the front curtain follower arm 422 are driven to rotate around the front curtain drive lever holding pin 181 and the front curtain follower arm support pin 183 respectively, the interlocked front curtain shielding blade set 411, too, is driven. Namely, the link mechanism of the known art constituted with the front curtain main arm 421 and the front curtain follower arm 422 engages the three blades in the front curtain shielding blade set 411 in interlocked operation, and the three blades are driven to move along the up/down direction over the photographic opening 461 in the front case 460.

Likewise, once the shielding curtain mechanism 400 is mounted at the sequence shutter drive unit 100 as described above, the rear curtain main arm 441 is rotatably supported by the rear curtain drive lever holding pin 182 and the rear curtain follower arm 442 is rotatably supported by the rear curtain follower arm support pin 184. As the rear curtain main arm 441 and the rear curtain follower arm 442 are driven to rotate around the rear curtain drive lever holding pin 182 and the rear curtain follower arm support pin 184 respectively, the interlocked rear curtain shielding blade set 431, too, is driven. Namely, the link mechanism of the known art constituted with the rear curtain main arm 441 and the rear curtain follower arm 442 engages the three blades in the rear curtain shielding blade set 431 in interlocked operation, and the three blades are driven to move along the up/down direction over the photographic opening 461 in the front case 460.

The Cam Phases and the States of the Switches at the Cam Code Substrate 161

Figure 11:
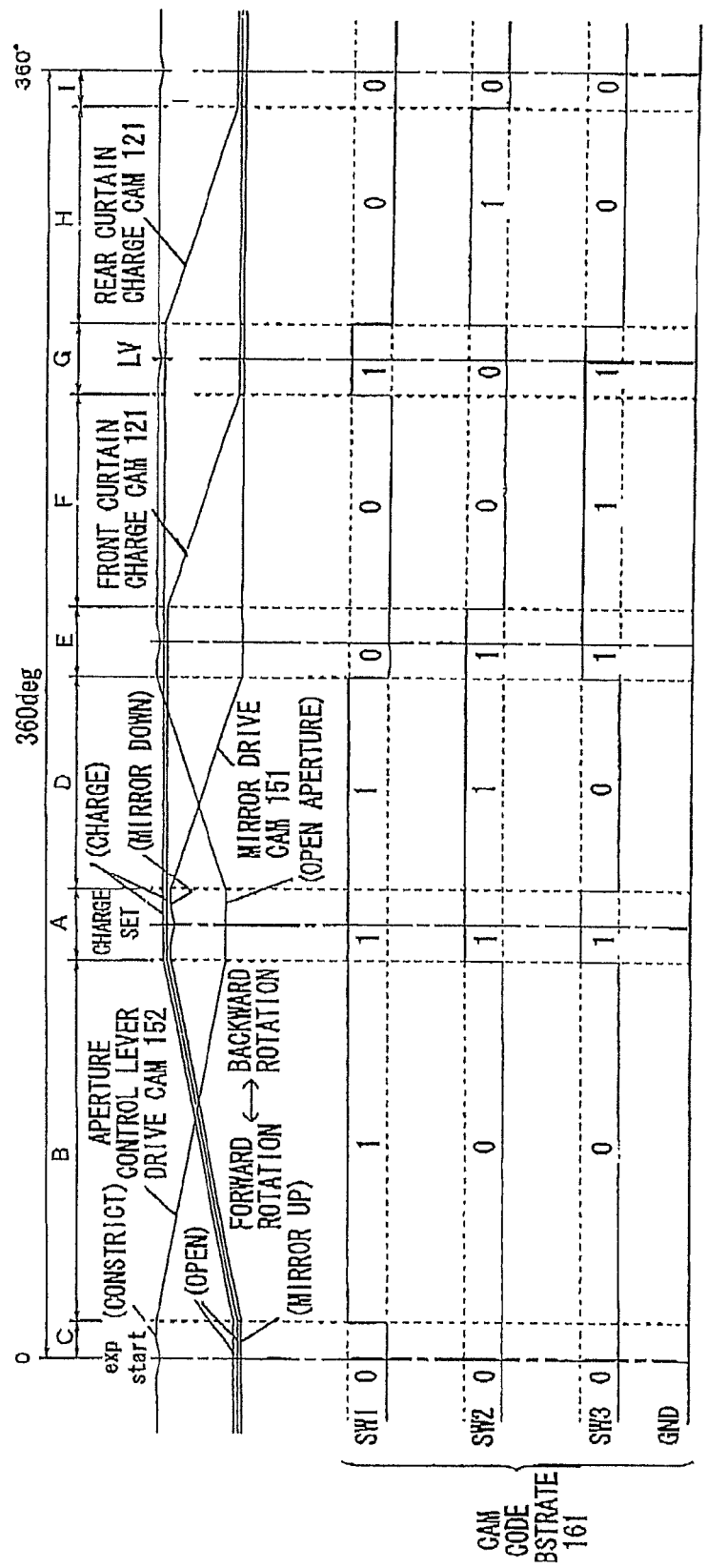
FIG. 11 presents a graph with the rotational phase of the camshaft indicated along the horizontal axis and the lift quantities of the individual cams and the on/off states of the three switches indicated along the vertical axis.

Now, in reference to FIG. 11, the on-off states assumed at the three switches at the cam code substrate 161 as the rotational phase of the cam shaft 172 changes (i.e., as the phases of the individual cams change) are described. FIG. 11 presents a graph with the rotational phase of the cam shaft 172 indicated along the horizontal axis and the lift quantities of the individual cams, i.e., the extents of lift induced by the cams, and the on-off states of the three switches indicated along the vertical axis. The term "lift quantity" in this context refers to the distance over which a given cam displaces the member contacting its cam surface (displacement quantity). In order to facilitate the explanation, the rotational phase (rotational angle) of the cam shaft 172 is defined so that the rotational angle assumed by the cam shaft 172 at the time of the exposure during a regular main photographing operation similar to that executed in a single-lens reflex camera in the related art, instead of the main photographing operation executed in the live view mode described later, is 0° with a positive rotational angle range set on the right side of the graph. It is to be noted that the cam shaft 172 rotates forward to decrease the rotational angle (to the left in the figure) and that it rotates backward to increase the rotational angle (to the right in the figure).

When the rotational angle of the cam shaft 172 is close to 0° and within the range indicated by C in the figure (C range), the displacement quantities (i.e., the lift quantities) of the cam contact portions 123a and 124a at the front curtain charge cam lever 123 and the rear curtain charge cam lever 124, displaced by the front curtain charge cam 121 and the rear curtain charge cam 122 respectively, are at their smallest. In addition, the displacement quantity (i.e., the lift quantity) of the cam contact portions 153a at the mirror drive cam lever 153, displaced forward by the mirror drive cam 151, is at its smallest. However, the displacement quantity (i.e., the lift quantity) of the cam contact portions 154a at the aperture control lever drive cam lever 154, displaced downward by the aperture control lever drive cam 152, is at its largest. In this condition, the three switches (SW1, SW2, SW3) at the cam code substrate 161 are all in the on state. Thus, the detection terminals (not shown) connected to the individual switches are all grounded.

When the cam shaft 172 rotates backward and the rotational angle shifts out of the C range into the range indicated by B in the figure (the B range), the lift quantities of the front curtain charge cam 121 and the rear curtain charge cam 122 both increase gradually as the rotational angle of the cam shaft 172 increases (as the cam shaft rotates further backward) within the B range. Likewise, the lift quantity of the mirror drive cam 151 increases gradually as the rotational angle of the cam shaft 172 increases. However, the lift quantity of the aperture control lever drive cam 152 gradually decreases as the rotational angle of the cam shaft 172 increases. Among the three switches at the cam code substrate 161, SW1 assumes the off state and SW2 and SW3 assume the on state. As a result, the detection terminals (not shown) connected to SW2 and SW3 are grounded.

When the rotational angle of the cam shaft 172 is in the range indicated by A in the figure (A range), the lift quantities of the front curtain charge cam 121 and the rear curtain charge cam 122 are at their largest. Likewise, the lift quantity of the mirror drive cam 151 is at its largest. The lift quantity of the aperture control lever drive cam 152, however, is at its smallest. The three switches at the cam code substrate 161 are all in the off state in this condition. Thus, none of the detection terminals (not shown) connected to the switches is grounded.

When the cam shaft 172 rotates backward and the rotational angle shifts out of the A range into the range indicated by D in the figure (D range), the lift quantities of the front curtain charge cam 121 and the rear curtain charge cam 122 remain at their largest regardless of the rotational angle of the cam shaft 172 assumed within the D range. However, as the rotational angle of the cam shaft 172 increases, the lift quantity of the mirror drive cam 151 gradually decreases. As the rotational angle of the cam shaft 172 increases, the lift quantity of the aperture control lever drive cam 152 gradually increases. Among the three switches at the cam code substrate 161, SW1 and SW2 assumed the off state and SW3 assumes the on state. Thus, the detection terminal (not shown) connected to SW3 is grounded.

When the rotational angle of the cam shaft 172 is in the range indicated by E in the figure (E range), the lift quantities of the front curtain charge cam 121 and the rear curtain charge cam 122 are at their largest. The lift quantity of the mirror drive cam 151 is at its smallest. The lift quantity of the aperture control lever drive cam 152 is at its largest. Among the three switches at the cam code substrate 161, SW1 assumes the on state and SW2 and SW3 assume the off state. Thus, the detection terminal (not shown) connected to SW1 is grounded.

When the cam shaft 172 rotates backward and the rotational angle shifts out of the E range into the range indicated by F in the figure (F range), the lift quantity of the front curtain charge cam 121 gradually decreases as the rotational angle of the cam shaft 172 increases within the F range. The lift quantity of the rear curtain charge cam 122 is at its largest regardless of the rotational angle of the cam shaft 172 in this range. The lift quantity of the mirror drive cam 151 is at its smallest regardless of the rotational angle of the camshaft 172. The lift quantity of the aperture control lever drive cam 152 is at its largest regardless of the rotational angle of the camshaft 172. Among the three switches at the cam code substrate 161, SW1 and SW2 assume the on state and SW3 assumes the off state. Thus, the detection terminals (not shown) connected to SW1 and SW2 are grounded.

When the rotational angle of the cam shaft 172 is in the range indicated by G in the figure (G range), the lift quantity of the front curtain charge cam 121 is at its smallest. The lift quantity of the rear curtain charge cam 122, however, is at its largest. The lift quantity of the mirror drive cam 151 is at its smallest, but the lift quantity of the aperture control lever drive cam 152 is at its largest. Among the three switches at the cam code substrate 161, SW1 and SW3 assume the off state and SW2 assumes the on state. Thus, the detection terminal (not shown) connected to SW2 is grounded.

When the cam shaft 172 rotates backward and the rotational angle shifts out of the G range into the range indicated by H in the figure (H range), the lift quantity of the front curtain charge cam 121 is at its smallest regardless of the rotational angle of the cam shaft 172 assumed within the H range. The lift quantity of the rear curtain charge cam 122 gradually decreases as the rotational angle of the cam shaft 172 increases within this range. The lift quantity of the mirror drive cam 151 is at its smallest regardless of the rotational angle of the camshaft 172. The lift quantity of the aperture control lever drive cam 152 is at its largest regardless of the rotational angle of the camshaft 172. Among the three switches at the cam code substrate 161, SW1 and SW3 assume the on state and SW2 assumes the off state. Thus, the detection terminals (not shown) connected to SW1 and SW3 are grounded.

The range indicated by I in the figure (I range) over which the cam shaft 172 assumes rotational angles close to 360° is the same as the C range explained earlier over which the cam shaft 172 assumes rotational angles close to. Namely, when the rotational angle of the cam shaft 172 is within the I range, the lift quantities of the front curtain charge cam 121 and the rear curtain charge cam 122 are at their smallest, the lift quantity of the mirror drive cam 151 is at its smallest and the lift quantity of the aperture control lever drive cam 152 is at its largest. Thus, the three switches (SW1, SW2 and SW3) at the cam code substrate 161 all assume the on state and the detection terminals (not shown) connected to the three switches are all grounded.

It is to be noted that when the cam shaft 172 rotates forward, the lift quantities of the individual cams change by reversing the process of the change described above. In addition, there is no upper limit to the extent to which the cam shaft 172 is allowed to rotate forward or backward. In other words, the cam shaft 172 is allowed to rotate forward or backward any number of times.

Photographing Operation Sequences

Operations executed at the individual units when capturing images with a camera equipped with the shutter device in the embodiment are now described in reference to FIG. 11 and also the sequence charts presented in FIGS. 12~18, by focusing on the operations of the sequence shutter drive unit 100 and the shielding curtain mechanism 400.

Figure 12:
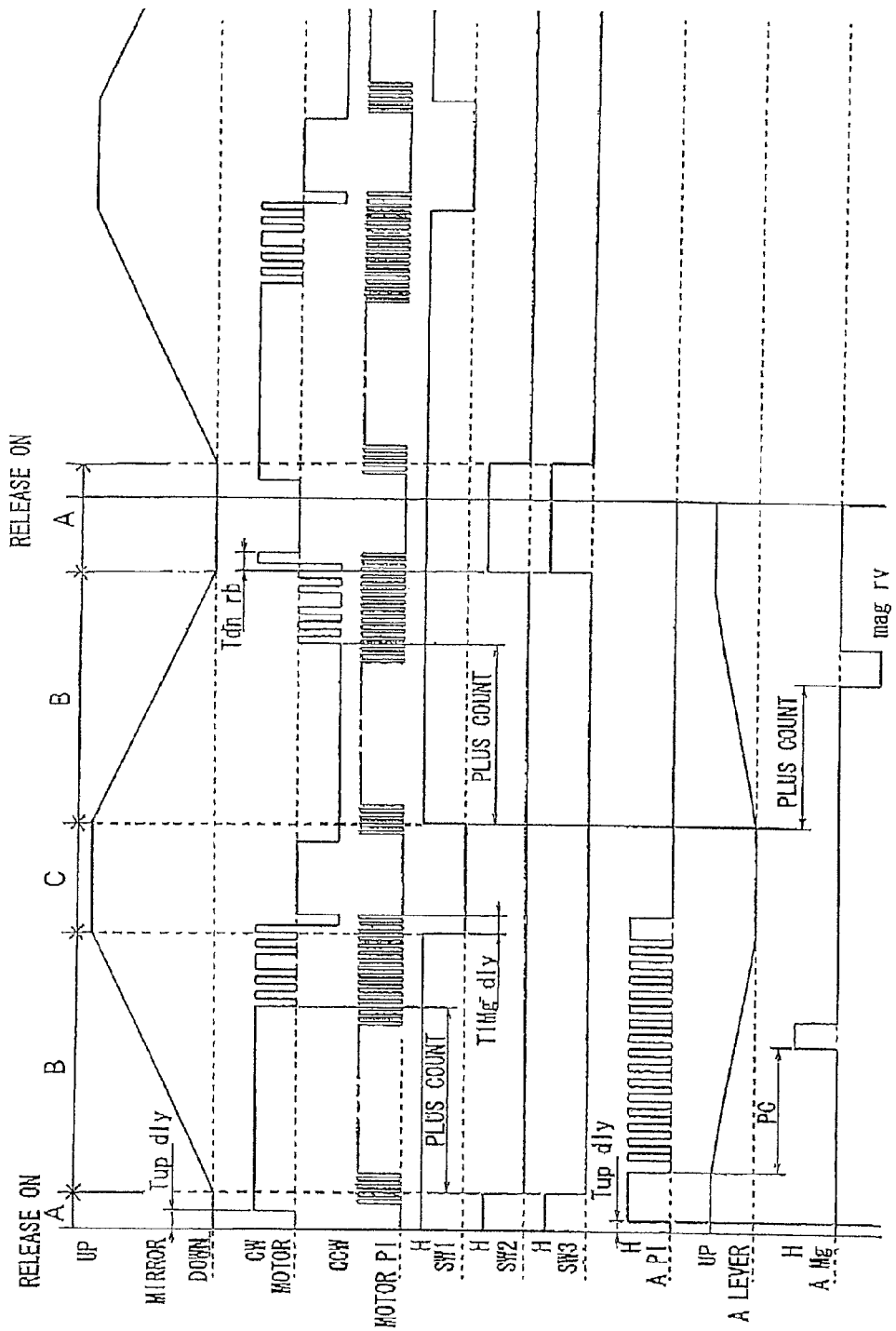
FIG. 12 presents a camera body sequence chart.

It is to be noted that in the sequence charts presented in FIG. 12 and subsequent figures, "Mirror" indicates the rotational position of the main mirror 11, "Motor" indicates the voltage applied to the sequence motor 4 and "Motor PI" indicates the pulse signals output from the photo-interrupter in order to detect the rotation quantity of the sequence motor 4, i.e., the extent to which the sequence motor 4 has rotated. "A PI" indicates the pulse signals output from the photo-interrupter in order to detect the rotation quantity of the aperture control lever 125, "A lever" indicates the rotational position of the aperture control lever 125 and "A Mg" indicates the voltage applied to the A Mg. It is to be noted that the A Mg, which is a magnet that releases a holding lever (not shown) holding the ratchet gear 128, releases its hold on the holding lever (not shown) as power is supplied thereto. "F Mg" and "E Mg" respectively indicate the voltages applied to the front curtain magnet 143 and the rear curtain magnet 144, whereas "F blade" and "E blade" respectively indicate the positions of the front curtain shielding blade set 411 and the rear curtain shielding blade set 431.

The sequence charts presented in FIG. 12 and subsequent figures each indicate the relationship between the various blocks in the sequence chart and the rotational angle of the cam shaft 172 by quoting the alphabet letters A~I indicating the various rotational angle ranges assumed by the cam shaft 172.

(1) Normal Photographing Operation (Normal Photographing Mode)

A normal photographing operation is executed through a photographing sequence similar to that of a single-lens reflex camera in the related art, through which the subject image reflected from the main mirror 11, which can be observed through the viewfinder optical system 20 during the preliminary phase, is photographed by moving the main mirror 11 out of the photographic optical path during the main photographing operation. As the normal photographing mode is selected as the photographing mode through an operation of an operation switch (not shown), the control circuit 31 controls the various units in the camera body 1 as described below in reference to FIGS. 11~13.

Prior to the photographing start (prior to the shutter release start), the aperture at the photographic lens 2 is in the open state and the main mirror 11 assumes the lowered position (observation position). The various components in the sequence shutter drive unit 100 and the shielding curtain mechanism 400 are in the states shown in FIGS. 2, 3 and 6~9. It is to be noted that the attitude of the main mirror 11 assuming the observation position is to be referred to as a "down position".

Prior to the photographing start, no power is supplied through the exciting coils of the front curtain magnet 143 and the rear curtain magnet 144. In other words, the exciting coils are in the demagnetized state. In addition, prior to the photographing start, the sequence motor 4 remains stationary and the cam shaft 172 assumes a rotational angle within the A range mentioned earlier (see FIGS. 11~13). The cams 121, 122, 151 and 152, which are driven by the sequence motor 4, assume the following phases all in the stationary state.

As explained earlier, the front curtain charge cam 121 is in the stationary state while sustaining the largest lift quantity (see FIGS. 2, 8 and 11). Thus, viewed from the left side of the camera body 1, the front curtain charge cam lever 123 will have stopped after having rotated clockwise around the shaft 111c, with the front curtain drive lever contact portion 123b pushing the contact portion 141d of the front curtain drive lever 141 upward (see FIGS. 2, 4, 5 and 8). Consequently, viewed from the front side of the camera body 1, the front curtain drive lever 141 is in the stationary state at a position assumed after having been rotated counterclockwise against the force applied from the spring 145.

Since the front curtain drive lever projecting portion 141b of the front curtain drive lever 141 is displaced upward under these circumstances (see FIGS. 3, 6 and 9), the front curtain main arm 421 of the shielding curtain mechanism 400 is in the stationary state at a position assumed after having been rotated clockwise around the rotating shaft hole 421a, viewed from the rear side of the camera body 1 (see FIGS. 3, 9 and 10). As a result, the front curtain shielding blade set 411, having been pulled upward and then having assumed the stationary state, shields the photographic opening 461 (see FIG. 13).

As explained earlier, the rear curtain charge cam 122 is in the stationary state while sustaining the largest lift quantity (see FIGS. 2, 8 and 11). Thus, viewed from the left side of the camera body 1, the rear curtain charge cam lever 124 will have stopped after having rotated clockwise around the shaft 111d, with the rear curtain drive lever contact portion 124b pushing the contact portion 142d of the rear curtain drive lever 142 upward (see FIGS. 2, 4, 5 and 8). Consequently, viewed from the front side of the camera body 1, the rear curtain drive lever 142 is in the stationary state at a position assumed after having been rotated counterclockwise against the force applied from the spring 146.

Since the rear curtain drive lever projecting portion 142b of the rear curtain drive lever 142 is displaced upward under these circumstances (see FIGS. 3, 6 and 9), the rear curtain main arm 441 of the shielding curtain mechanism 400 is in the stationary state at a position assumed after having been rotated clockwise around the rotating shaft hole 441a, viewed from the rear side of the camera body 1 (see FIGS. 3, 9 and 10). As a result, the rear curtain shielding blade set 431, having been pulled upward assumes a stationary state at the retreat position above the photographic opening 461 (see FIG. 13).

As described earlier, the mirror drive cam 151 is in the stationary state while sustaining the largest lift quantity (see FIGS. 6, 7 and 11). Thus, viewed from the right side of the camera body 1, the mirror drive cam lever 153 will have stopped after having rotated clockwise around the shaft 111e against the force applied by the main mirror drive spring (not shown), thereby allowing the mirror drive shaft contact portion 153b to retreat downward and allowing downward displacement of the pin 13a at the main mirror holding frame 13. As a result, the main mirror 11 will have been caused to rotate downward by the force applied by a spring (not shown) and stop at the observation position (a position within the photographic optical path) assumed to guide the subject light toward the viewfinder optical system 20 (see FIGS. 11~13).

As explained earlier, the aperture control lever drive cam 152 is in the stationary state while sustaining the smallest lift quantity (see FIG. 6). Thus, viewed from the right side of the camera body 1, the aperture control lever drive cam lever 154 will have been caused to rotate clockwise around the shaft 111f by the force applied from the aperture release spring 173. This, in turn, will have caused the aperture control lever contact portion 154b of the aperture control lever drive cam lever 154 to push up the arm 125a of the aperture control lever 125, thereby allowing upward displacement of the contact portion 125b of the aperture control lever 125 and setting the aperture of the photographic lens 2 in the open state (see FIGS. 8, 11 and 12).

It is to be noted that if an external force is applied to press the contact portion 125b of the aperture control lever 125 downward in order to, for instance, mount the photographic lens 2 prior to the shutter release start, the aperture control lever 125 and the aperture control lever drive cam lever 154 rotate against the force applied from the aperture release spring 173 and, as a result, the contact portion 125b moves downward in correspondence to the degree of external force.

As the shutter release button (not shown) is pressed halfway down and a halfway press operation signal is input from a halfway press switch (not shown), photometering and rangefinding calculations are executed. The control circuit 31 executes photometering calculation of the known art based upon the brightness of the subject detected via the photometering unit 5 and determines through arithmetic operation a control aperture value and a shutter speed. The control circuit 31 also executes rangefinding calculation of the known art based upon the focus detection results provided from the AF unit 6 and adjusts the focusing condition of the photographic lens 2.

As the shutter release button (not shown) is pressed all the way down and a full press operation signal is input from a full press switch (not shown), the shutter release operation described below is executed. The control circuit 31 excites the front curtain magnet 143 and the rear curtain magnet 144 (see FIG. 13). The front curtain magnet 143 and the rear curtain magnet 144 thus excited respectively attract and hold fast the magnetically attracted portion 141e of the front curtain drive lever 141 in contact with the front curtain magnet and the magnetically attracted portion 142e of the rear curtain drive lever 142 in contact with the rear curtain magnet. In addition, as the full press operation signal is input, the control circuit 31 causes the sequence motor 4 to start to rotate (forward). Then, after the cams 121, 122, 151 and 152 rotate by a predetermined rotational angle, the sequence motor 4 is stopped. As a result, the rotational angle of the cam shaft 172, initially in the A range as described earlier, shifts into the B range and subsequently into the C range.

It is to be noted that the control circuit 31 controls the timing with which the sequence motor 4 stops by detecting the phase of the cam code substrate 161 (i.e., the rotational angle of the cam shaft 172) based upon the states of the switches SW1~SW3 described earlier. In more specific terms, upon detecting a change in the states of SW1~SW3, the control circuit 31 allows a predetermined number of pulses (Motor P1) to be output or a predetermined length of time to elapse and then applies a brake on the sequence motor 4 by applying an a voltage with an opposite polarity from that of the voltage having been applied up to then, over a predetermined length of time. As a result, the cam shaft 172 stops after rotating to a position slightly beyond the rotational angle at which the change in the states of SW1~SW3 has occurred.

The rotation of the sequence motor 4 described above causes the front curtain charge cam 121 to rotate to the phase (C range) with the smallest lift quantity before it stops (see FIG. 11). Thus, viewed from the left side of the camera body 1, the front curtain charge cam lever 123 is caused to rotate by the force applied from the spring (not shown) around the shaft 111c, pulling the front curtain drive lever contact portion 123b downward. However, since the magnetically attracted portion 141e of the front curtain drive lever 141 is held fast to the front curtain magnet 143, the front curtain drive lever 141, having rotated counterclockwise viewed from the front side of the camera body 1 against the force applied from the spring 145, remains in the stationary state. Namely, the front curtain shielding blade set 411 in the stationary state shields the photographic opening 461 (see FIG. 13).

The rear curtain charge cam 122 also stops after rotating to the phase (C range) with the smallest lift quantity. Thus, viewed from the left side of the camera body 1, the rear curtain charge cam lever 124 is caused to rotate by the force applied from the spring (not shown) around the shaft 111d, pulling the rear curtain drive lever contact portion 124b downward. However, since the magnetically attracted portion 142e of the rear curtain drive lever 142 is held fast to the rear curtain magnet 144, the rear curtain drive lever 142, having rotated counterclockwise viewed from the front side of the camera body 1 against the force applied from the spring 146, remains in the stationary state. Namely, the rear curtain shielding blade set 431 assumes the retreat position above the photographic opening 461 (see FIG. 13).

The mirror drive cam 151 stops after rotating to the phase with the smallest lift quantity (C range) (see FIG. 11). Thus, viewed from the right side of the camera body 1, the mirror drive cam lever 153 is caused to rotate counterclockwise around the shaft 111e by the force applied from the main mirror drive spring (not shown). As the mirror drive cam lever 153 rotates, the mirror drive shaft contact portion 153b pushes the pin 13a at the main mirror holding frame 13 upward. As a result, the main mirror 11 swings upward against the force applied from the spring (not shown) and stops after moving (ascending) to the retreat position (mirror-up position) away from the photographic optical path (see FIGS. 12 and 13). It is to be noted that the position of the main mirror 11 assuming the retreat position is referred to as "up position".

The aperture control lever drive cam 152 stops after rotating to the phase with the largest lift quantity (C range) (see FIG. 11). Thus, viewed from the right side of the camera body 1, the aperture control lever drive cam lever 154 rotates counterclockwise around the shaft 111f against the force applied from the aperture release spring 173. As a result, the aperture control lever contact portion 154b of the aperture control lever drive cam lever 154 moves downward. Since the aperture control lever contact portion 154b is linked with the arm 125a of the aperture control lever 125 via a spring (not shown) as described above, the downward displacement of the aperture control lever contact portion 154b causes the arm 125a of the aperture control lever 125 to be pulled downward (see FIG. 12). This, in turn, displaces the contact portion 125b of the aperture control lever 125 downward and, as a result, the aperture at the photographic lens 2 is constricted.

As the aperture control lever 125 rotates to constrict the aperture at the photographic lens 2, the rotation quantity of the aperture control lever 125, indicated as the number of pulses output as pulse signals from the photo-interrupter (A PI), is detected (see FIG. 12). Upon determining that a predetermined number of pulses have been output as pulse signals from the photo-interrupter, the control circuit 31 supplies power to A Mg to stop the rotation of the ratchet gear 128 by engaging the tab of the holding lever (not shown) with the ratchet gear 128 (see FIG. 12).

As the rotation of the ratchet gear 128 stops, the rotation of the input-side gear at the aperture control gear 126 to which the ratchet gear 128 is attached and the rotation of the fan-shaped gear portion 125d (i.e., the aperture control lever 125) interlocking with the input-side gear, also stop. As a result, the lever (not shown) at the photographic lens 2 is driven in conformance to the displacement of the contact portion 125b at the aperture control lever 125, so as to constrict the aperture at the photographic lens 2 until the control aperture value is achieved.

While the aperture control lever drive cam lever 154 continues to rotate after the rotation of the ratchet gear 128 stops (i.e., after the rotation of the aperture control lever 125 stops), the rotation of the aperture control lever drive cam lever 154 stops once the aperture control lever drive cam 152 stops. It is to be noted that the operations in the sequence chart presented in FIG. 12 are executed based upon the control aperture value calculated so as to constrict the aperture at the photographic lens 2 to the maximum extent, and that if a smaller value is calculated for the control aperture value, the pulse signal output from the A PI stops earlier than the pulse signal output stop time point in FIG. 12.

Figure 13:
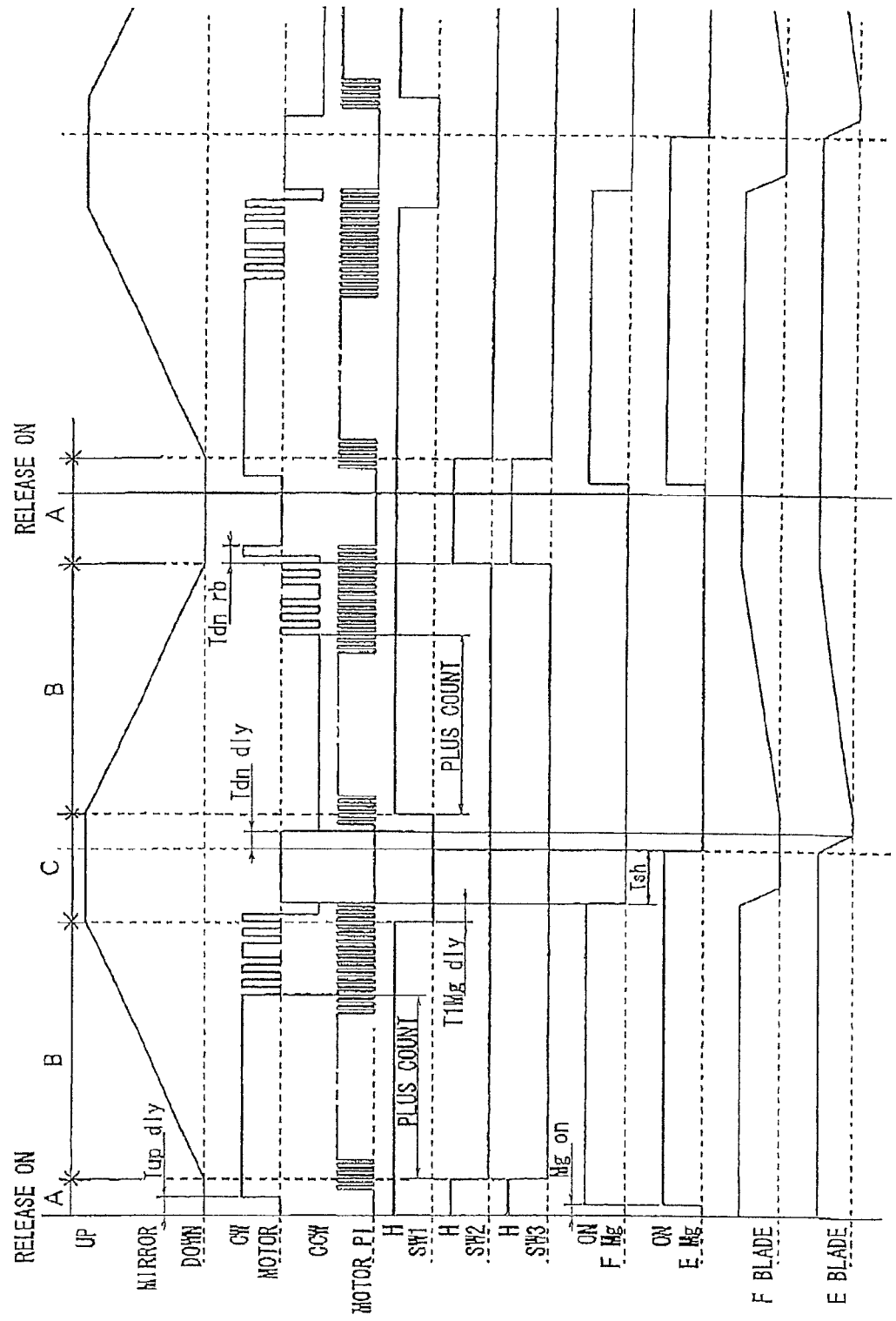
FIG. 13 presents a camera body sequence chart.

After the aperture at the photographic lens 2 is adjusted to achieve the control aperture value, the control circuit 31 stops the power supply to the exciting coil of the front curtain magnet 143, as shown in FIG. 13. As a result, the magnetically attracted portion 141e of the front curtain drive lever 141 is released and allowed to separate itself from the front curtain magnet. Thus, viewed from the front side of the camera body 1, the front curtain drive lever 141 is caused to rotate clockwise by the force applied from the spring 145. As the rotation of the front curtain drive lever 141 causes downward displacement of the front curtain drive lever projecting portion 141b, the front curtain main arm 421 at the shielding curtain mechanism 400 rotates counterclockwise around the rotating shaft hole 421a viewed from the rear side of the camera body 1. Consequently, the front curtain shielding blade set 411 moves downward over the photographic opening 461 in the front case 460, thereby unshielding the photographic opening 461. Namely, the front curtain shielding blade set 411 is driven by the force applied from the spring 145. At this stage, the rear curtain shielding blade set 431 is still in the stationary state at the retreat position above the photographic opening 461.

While the photographic opening 461 is in the unshielded state, an image is captured by controlling the charge storage at the image sensor 3. Once the charge storage period corresponding to the shutter speed having been calculated as described above elapses, the control circuit 31 stops the power supply to the exciting coil of the rear curtain magnet 144. As a result, the magnetically attracted portion 142e of the rear curtain drive lever 142 is released and allowed to separate itself from the front curtain magnet. Thus, viewed from the front side of the camera body 1, the rear curtain drive lever 142 is caused to rotate clockwise by the force applied from the spring 146. As the rotation of the rear curtain drive lever 142 causes downward displacement of the rear curtain drive lever projecting portion 142b, the rear curtain main arm 441 at the shielding curtain mechanism 400 rotates counterclockwise around the rotating shaft hole 441a viewed from the rear side of the camera body 1. Consequently, the rear curtain shielding blade set 431 moves downward over the photographic opening 461 in the front case 460, thereby shielding the photographic opening 461. Namely, the rear curtain shielding blade set 431 is driven by the force applied from the spring 146. As described above, the length of time over which the electrical charges are stored at the image sensor 3 is controlled via the mechanical shutter in the normal photographing mode. When the sequence described above is completed, the shutter release operation and the photographing operation end.

Immediately after the shutter release operation and the photographing operation described above end, the following reset operation is executed. The control circuit 31 causes the sequence motor 4 to start rotating backward so as to rotate the cams 121, 122, 151 and 152 to the initial rotational phases assumed prior to the shutter release start, and then the control circuit stops the sequence motor 4. As a result, the rotational angle of the cam shaft 172 shifts out of the C range into the B range and ultimately into the A range.

The front curtain charge cam 121 stops after rotating to the phase with the largest lift quantity (A range) (see FIGS. 2, 8 and 11). Thus, viewed from the left side of the camera body 1, the front curtain charge cam lever 123 rotates clockwise around the shaft 111c, which causes the front curtain drive lever contact portion 123b to push the contact portion 141d of the front curtain drive lever 141 upward (see FIGS. 2, 4, 5 and 8). As a result, the front drive lever 141 rotates counterclockwise viewed from the front side of the camera body 1 against the force applied by the spring 145.

Consequently, the front curtain drive lever projecting portion 141b of the front curtain drive lever 141 moves upward, causing a clockwise rotation of the front curtain main arm 421 at the shielding curtain mechanism 400 around the rotating shaft hole 421a viewed from the rear side of the camera body 1 (see FIGS. 3, 9 and 10). This, in turn, causes the front curtain shielding blade set 411 to travel upward to shield the photographic opening 461. The front curtain shielding blade set 411 is reset (shutter charged) through this process (see FIG. 13).

The rear curtain charge cam 122 stops after rotating to the phase with the largest lift quantity (A range) (see FIGS. 2, 8 and 11). Thus, viewed from the left side of the camera body 1, the rear curtain charge cam lever 124 rotates clockwise around the shaft 111d, which causes the rear curtain drive lever contact portion 124b to push the contact portion 142d of the rear curtain drive lever 142 upward (see FIGS. 2, 4, 5 and 8). As a result, the rear drive lever 142 rotates counterclockwise viewed from the front side of the camera body 1 against the force applied by the spring 146.

Consequently, the rear curtain drive lever projecting portion 142b of the rear curtain drive lever 142 moves upward, causing a clockwise rotation of the rear curtain main arm 441 at the shielding curtain mechanism 400 around the rotating shaft hole 441a viewed from the rear side of the camera body 1 (see FIGS. 3, 9 and 10). This, in turn, causes the rear curtain shielding blade set 431 to travel upward to retreat to the position above the photographic opening 461. The rear curtain shielding blade set 431 is reset (shutter charged) through this process (see FIG. 13).

The mirror drive cam 151 stops after rotating to the phase with the largest lift quantity (A range) (see FIGS. 6, 7 and 11). Thus, viewed from the right side of the camera body 1, the mirror drive cam lever 153 rotates clockwise around the shaft 111e against the force applied from the main mirror drive spring (not shown), allowing the mirror drive shaft contact portion 153b to retreat downward and allowing downward displacement of the pin 13a at the main mirror holding frame 13. As a result, the force applied by the spring (not shown) causes the main mirror 11 to swing downward (the mirror is lowered) until it stops at the observation position (the position in the photographic optical path) (see FIGS. 12 and 13).

The aperture control lever drive cam 152 stops after rotating to the phase with the smallest lift quantity (A range) (see FIGS. 6 and 11). Thus, viewed from the right side of the camera body 1, the aperture control lever drive cam lever 154 is caused to rotate clockwise around the shaft 111f by the force applied from the aperture release spring 173. This, in turn, causes the aperture control lever contact portion 154b of the aperture control lever drive cam lever 154 to push the arm 125a of the aperture control lever 125 upward, allowing the contact portion 125b of the aperture control lever 125 to move upward to set the aperture at the photographic lens 2 in the open state (see FIGS. 8 and 12).

Through the reset operation described above, the camera equipped with the shutter device achieved in the embodiment returns to the initial state prior to the photographing start (prior to the shutter release start). In the normal photographing mode described above, as the shutter release button is pressed all the way down, the cam shaft 172 rotates forward with its rotational angle shifting out of the A range into the B range and subsequently into the C range. Once the rotational angle is in the C range, the forward rotation stops. The cam shaft rotates backward during the reset operation and stops once the rotational angle shifts out of the B range into the A range.

(2) Through Image Display Operation (Live View Mode)

(2-1) When Live View Mode is on

In the live view mode, a through image is displayed at the rear-side display monitor 7. Once the live view mode is selected as the photographing mode through an operation of the operation switch (not shown), the control circuit 31 controls the various units of the camera body 1 as described below in reference to FIGS. 11, 14 and 15.

Figure 14:
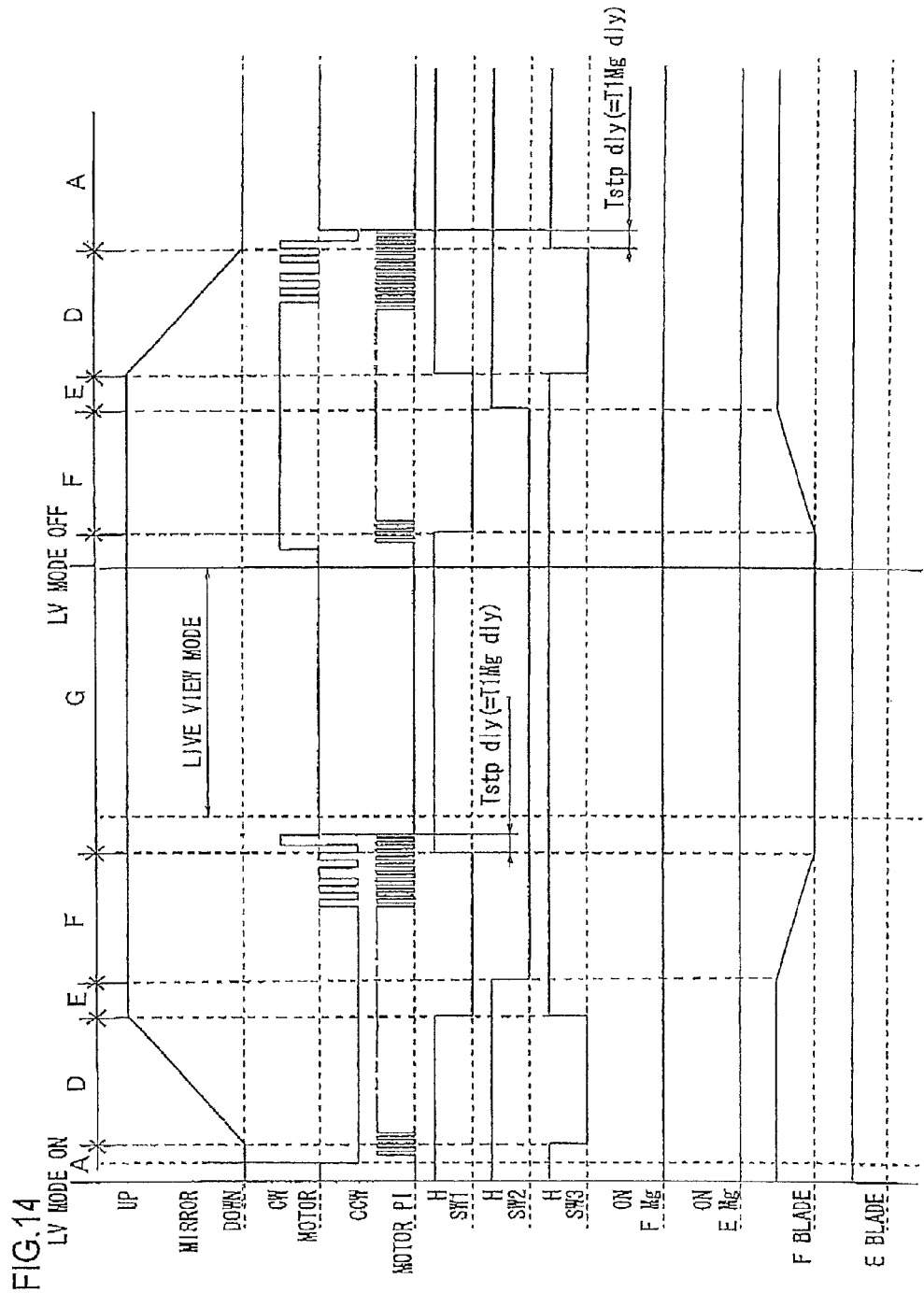
FIG. 14 presents a camera body sequence chart.

The control circuit 31 rotates the sequence motor 4 backward and once the sequence motor has rotated to the point at which the rotational angle of the cam shaft 172, having shifted out of the A range mentioned earlier, finally shifts into the G range through the ranges D~F, the control circuit 31 stops the sequence motor 4 (see FIGS. 11 and 14).

The mirror drive cam 151 stops once it has rotated to reduce the lift quantity to the minimum (see FIG. 11). While the rotational angle of the cam shaft 172 is in the D range, the lift quantity of the mirror drive cam 151 decreases gradually as the cam shaft 172 continues to rotate backward. Thus, the main mirror 11 moves to the retreat position as explained earlier (see FIG. 14).

The aperture control lever drive cam 152 stops once it has rotated to increase the lift quantity to the maximum (see FIG. 11). While the rotational angle of the cam shaft 172 is in the D range, the lift quantity of the aperture control lever drive cam 152 gradually increases as the cam shaft 172 continues to rotate backward. Thus, the arm 125a of the aperture control lever 125 is pulled downward as described earlier and the aperture at the photographic lens 2 is constricted (see FIG. 14).

As the aperture control lever 125 rotates so as to constrict the aperture at the photographic lens 2, as described above, the control circuit 31 executes the photometering calculation of the known art based upon the brightness of the subject detected via the photometering unit 5 and determines the control aperture value through an arithmetic operation. Upon deciding that the predetermined number of pulses have been output as pulse signals from the photo-interrupter (API), the control circuit 31 supplies power to A Mg to engage the tab of the holding lever (not shown) with the ratchet gear 128, thereby stopping the rotation of the ratchet gear 128. Consequently, the aperture at the photographic lens 2 is adjusted until the control aperture value is achieved.

The front curtain charge cam 121 rotates so as to reduce the lift quantity to its smallest before it stops (see FIG. 11). As explained earlier, while the rotational angle of the cam shaft 172 is within the F range, the lift quantity of the front curtain charge cam 121 gradually decreases as the camshaft 172 continues to rotate backward. Thus, the force applied by the spring (not shown) causes the front curtain charge cam lever 123 to rotate counterclockwise around the shaft 111c, viewed from the left side of the camera body 1 and, as a result, the front curtain drive lever contact portion 123b is pulled down. In addition, since the magnetically attracted portion 141e of the front curtain drive lever 141 is not held fast onto the front curtain magnet 143, the force applied from the spring 145 causes the front curtain drive lever 141 to rotate clockwise, viewed from the front side of the camera body 1, so as to follow the front curtain drive lever contact portion 123b. Namely, the front curtain shielding blade set 411 moves over the photographic opening 461 in the front case 460 along the downward direction, thereby unshielding the photographic opening 461 (see FIG. 14).

It is to be noted that the rear curtain charge cam 122 sustains the condition in which it induces the maximum extent of lift quantity (see FIG. 11). Thus, the rear curtain shielding blade set 431 assuming the retreat position above the photographic opening 461, is in a stationary state (see FIG. 14). Through the operation described above, the main mirror 11 moves to the retreat position, the front curtain shielding blade set 411 moves to a position below the photographic opening 461 and the rear curtain shielding blade set 431 retreats to a position above the photographic opening 461, thereby allowing the subject light to reach the image sensor 3.

After stopping the sequence motor 4, the control circuit 31 controls the individual units so as to display the through image at the rear-side display monitor 7. Under the control executed by the control circuit, the through image is thus brought up on display at the rear-side display monitor 7. It is to be noted that while the through image is on display, the control circuit 31 repeatedly executes focus adjustment for the photographic lens 2 by repeatedly executing rangefinding calculation (image plane AF) through a contrast method of the known art based upon the through image obtained via the image sensor 3 engaged in the imaging operation. In addition, while the through image is up on display, the control circuit 31 repeatedly executes arithmetic operation to calculate the shutter speed (the length of charge storage time at the image sensor 3) at the electronic shutter based upon the brightness of the through image obtained via the image sensor 3 engaged in the imaging operation.

(2-2) When the Live View Mode is Off (when the Normal Photographing Mode is Selected)

As the photographing mode is switched from the live view mode to the normal photographing mode in response to an operation of the operation switch (not shown), the control circuit 31 controls the various units of the camera body 1 as described below.

The control circuit 31 halts the through image display at the rear-side display monitor 7 and causes the sequence motor 4 to rotate forward until the rotational angle of the cam shaft 172 reaches the A range after shifting out of the G range and moving through the F~D ranges. It then stops the sequence motor 4 (see FIGS. 11 and 14).

The front curtain charge cam 121 rotates so as to increase the lift quantity to its largest before it stops (see FIG. 11). While the rotational angle of the cam shaft 172 is within the F range, the lift quantity of the front curtain charge cam 121 gradually increases as the cam shaft 172 continues to rotate forward. Thus, the front curtain charge cam lever 123 is caused to rotate clockwise around the shaft 111c, viewed from the left side of the camera body 1. Consequently, the front curtain shielding blade set 411 is reset (shutter charged) (see FIG. 14).

The mirror drive cam 151 stops after rotating to the phase with the largest lift quantity (A range) (see FIGS. 11 and 14). As described above, while the rotational angle of the cam shaft 172 is within the D range, the lift quantity of the mirror drive cam 151 gradually increases as the cam shaft 172 continues to rotate forward. As a result, the main mirror 11 moves to the observation position.

The aperture control lever drive cam 152 stops after rotating to the phase with the smallest lift quantity (A range) (see FIGS. 11 and 14). As described above, while the rotational angle of the cam shaft 172 is within the D range, the lift quantity of the aperture control lever drive cam 152 gradually decreases as the cam shaft 172 continues to rotate forward. As a result, the aperture at the photographic lens 2 is set in the open state.

Through the operation described above, the camera body 1 and the photographic lens 2 are both restored to the pre-photographing start (pre-shutter release start) state in the normal photographing mode. As described above, when the photographing mode is switched from the normal photographing mode to the live view mode, the cam shaft 172 is caused to rotate backward and the backward rotation stops once the rotational angle, initially in the A range as explained earlier, shifts into the G range through the D~F ranges. When the photographing mode is switched from the live view mode to the normal photographing mode, the cam shaft 172 is caused to rotate forward and the forward rotation stops once the rotational angle, initially in the G range as explained earlier, shifts into the A range through the F~D ranges.

(2-3) When the Shutter Release Button is Pressed in the Live View Mode

Figure 15:
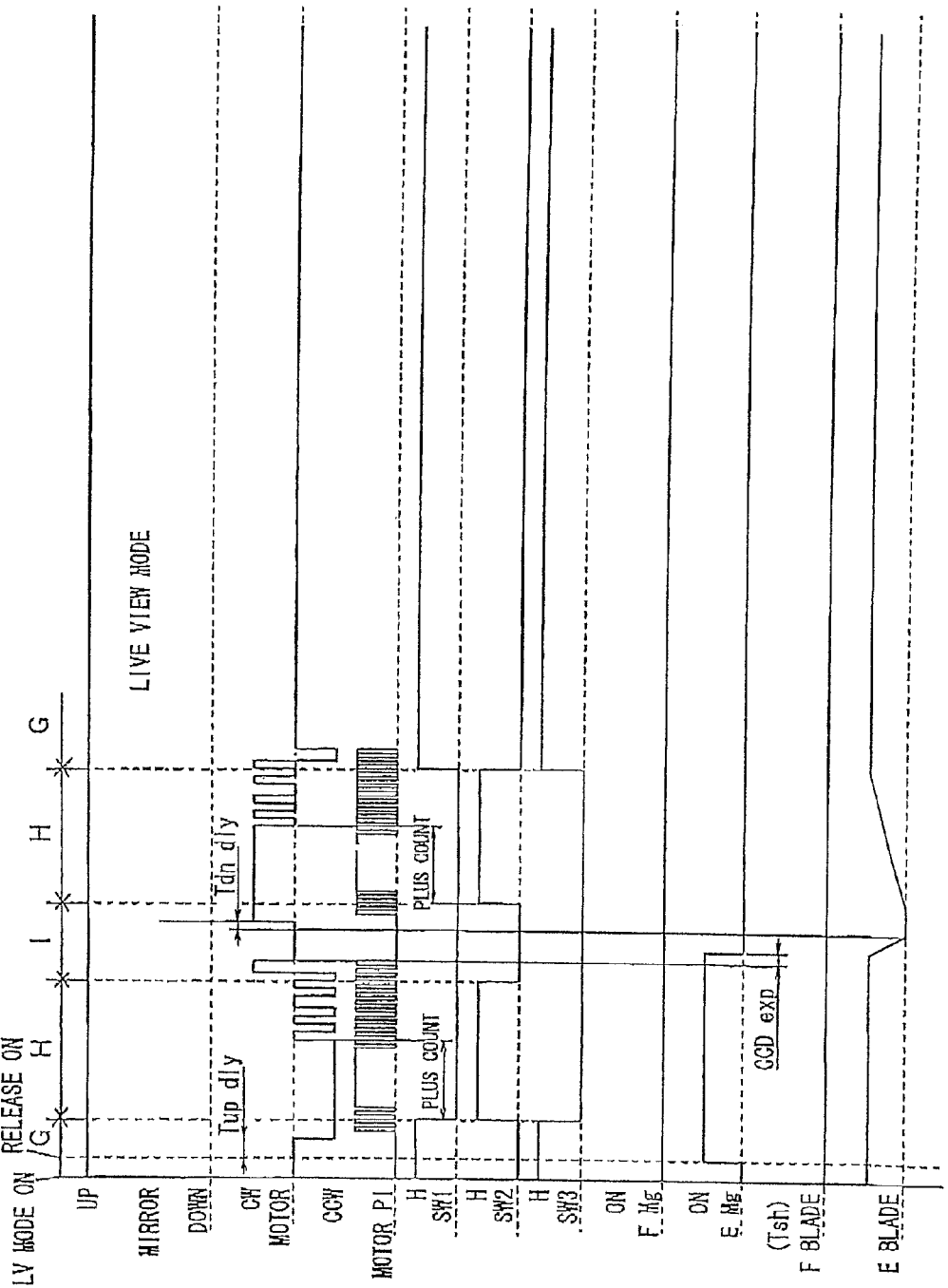
FIG. 15 presents a camera body sequence chart.

FIG. 15 presents a sequence chart of the sequence through which the operation is executed in response to the depression of the shutter release button in the live view mode. As the shutter release button (not shown) is pressed all the way down and a full press operation signal is input from the full press switch (not shown), the control circuit 31 ends the image plane AF operation and the shutter speed calculation and also excites the rear curtain magnet 144 (see FIG. 15). In response, the focus adjustment for the photographic lens 2 ends and the shutter speed is determined. The rear curtain magnet 144 attracts and holds fast the magnetically attracted portion 142e of the rear curtain drive lever 142 in contact. In addition, in response to the full press operation signal input thereto, the control circuit 31 causes the sequence motor 4 to rotate backward after allowing a predetermined length of time (Tup dly in FIG. 15) to elapse, and then stops the sequence motor 4 once its rotation has caused the rotational angle of the cam shaft 172, initially in the G range as explained earlier, shifts into the I range through the H range (see FIG. 15).

The rear curtain charge cam 122 rotates so as to reduce the lift quantity to its smallest before it stops (see FIGS. 11 and 15). As explained earlier, while the rotational angle of the cam shaft 172 is within the H range, the lift quantity of the rear curtain charge cam 122 gradually decreases as the cam shaft 172 continues to rotate backward. Thus, the force applied by the spring (not shown) causes the rear curtain charge cam lever 124 to rotate counterclockwise around the shaft 111d, viewed from the left side of the camera body 1 and, as a result, the rear curtain drive lever contact portion 124b is pulled down. However, since the magnetically attracted portion 142e of the rear curtain drive lever 142 is held fast onto the rear curtain magnet 144, the rear curtain drive lever 142 sustains the stationary state at the position to which it has rotated counterclockwise, viewed from the front side of the camera body 1, against the force applied by the spring 146. Namely, the rear curtain shielding blade set 431 assumes the stationary state at the retreat position above the photographic opening 461 (see FIG. 15).

It is to be noted that since the lift quantities of the front curtain charge cam 121 and the mirror drive cam 151 both remain unchanged, the front curtain shielding blade set 411 is not reset and the main mirror 11 does not move away from the retreat position. In addition, since the lift quantity of the aperture control lever drive cam 152 remains unchanged, the aperture at the photographic lens 2 is not set in the open state. It is to be noted that until the live view mode is cleared as described above, the aperture at the photographic lens 2 sustains the constricted state having been set in the live mode.

After stopping the sequence motor 4, the control circuit 31 stores electrical charges at the image sensor 3 through the function of the electronic shutter over the length of time corresponding to the shutter speed of the electronic shutter having been determined as explained earlier (over the length of time corresponding to CCD exp in FIG. 15), and then stops the power supply to the exciting coil of the rear curtain magnet 144. In response, the magnetically attracted portion 142e of the rear curtain drive lever 142 is released and allowed to separate itself from the rear curtain magnet, which, in turn, allows the rear curtain shielding blade set 431 to move downward over the photographic opening 461 in the front case 460 to shield the photographic opening 461. The photographing operation in the live view mode then ends. It is to be noted that the aperture at the photographic lens 2 sustains the constricted state having been set through the photographing operation executed in the live view mode, as described earlier. Thus, the exposure is optimally adjusted based upon the shutter speed at the electronic shutter.

Immediately upon completion of the photographing operation described above, the following operation is executed so as to bring the through image back up on display at the rear-side display monitor 7. The control circuit 31 rotates the sequence motor 4 forward and once the sequence motor has rotated to the point at which the rotational angle of the cam shaft 172, having shifted out of the I range, ultimately shifts into the G range through the H range, the control circuit 31 stops the sequence motor 4 (see FIGS. 11 and 15).

The rear curtain charge cam 122 rotates so as to increase the lift quantity to its largest before it stops (see FIG. 11). As explained earlier, while the rotational angle of the camshaft 172 is within the H range, the lift quantity of the rear curtain charge cam 122 gradually increases as the camshaft 172 continues to rotate forward. The rear curtain charge cam lever 124 thus rotates clockwise around the shaft 111d, viewed from the left side of the camera body 1 against the force applied by the spring (not shown) and, as a result, the rear curtain drive lever contact portion 124b is pulled up. This, in turn, causes the rear curtain shielding blade set 431 to travel upward to the retreat position above the photographic opening 461, as described earlier. The rear curtain shielding blade set 431 is reset (shutter charged) through this process (see FIG. 15).

As explained earlier, since the lift quantities of the front curtain charge cam 121 and the mirror drive cam 151 both remain unchanged, the front curtain shielding blade set 411 is not reset and the main mirror 11 does not move away from the retreat position. In addition, since the lift quantity of the aperture control lever drive cam 152 remains unchanged, the aperture at the photographic lens 2 is not set in the open state and until the live view mode is cleared, the aperture at the photographic lens sustains the constricted state having been set in the live mode.

As the rotational angle of the cam shaft 172 shifts into the G range, the control circuit 31 stops the sequence motor 4. It then controls the individual units so as to display the through image at the rear-side display monitor 7. The through image is thus brought back up on display at the rear-side display monitor 7. In addition, the control circuit 31 resumes the focus adjustment for the photographic lens 2 and the arithmetic operation for determining the shutter speed at the electronic shutter.

(3) Imaging Operation Executed by Controlling Via the Mechanical Shutter the Length of Charge Storage Time at the Image Sensor 3 while the Through Image is Up on Display (Live View Mechanical Shutter Photographing Mode)

As a live view mechanical shutter photographing mode is selected as the photographing mode in the camera achieved in the embodiment, the photographic opening 461 is first shielded by charging the front curtain shielding blade set 411 while the through image is up on display and then the mechanical shutter is engaged in operation so as to enable imaging operation at the image sensor 3 by controlling the length of electrical charge storage time at the image sensor 3 with the mechanical shutter. As the live view mechanical shutter photographing mode is selected as the photographing mode in response to an operation of the operation switch (not shown), the control circuit 31 controls the various units in the camera body 1 as described below. The control executed by the control circuit in this situation is now described in reference to FIGS. 11, 14 and 16.

As the photographing mode is switched from, for instance, the normal photographing mode to the live view mechanical shutter photographing mode, the control circuit 31 causes the sequence motor 4 to rotate backward until the rotational angle of the cam shaft 172, initially in the A range, shifts into the G range through the D–F ranges, as in the control operation having been described earlier in "(2-1) When live view mode is on". Once the rotational angle shifts into the G range, the control circuit stops the sequence motor 4 (see FIGS. 11 and 14). As a result, the main mirror 11 moves to the retreat position (see FIGS. 14 and 16), the aperture at the photographic lens 2 is adjusted so as to achieve the control aperture value and the front curtain shielding blade set 411 moves over the photographic opening 461 in the front case 460 downward to unshield the photographic opening 461 (see FIGS. 14 and 16).

Upon stopping the sequence motor 4, the control circuit 31 controls the various units so as to display the through image at the rear-side display monitor 7. Through this process, the through image is brought up on display at the rear-side display monitor 7. It is to be noted that as in the control operation described in "(2-1) When live view mode is on", the control circuit 31 repeatedly executes focus adjustment for the photographic lens 2 through image plane AF and repeatedly executes arithmetic operation to calculate the shutter speed at the electronic shutter based upon the brightness of the through image captured by engaging the image sensor 3 in imaging operation while the through image is up on display.

As the shutter release button (not shown) is pressed all the way down and a full press operation signal is input from the full press switch (not shown), the control circuit 31 ends the image plane AF operation and the shutter speed calculation and halts the through image display at the rear-side display monitor 7. In response, the focus adjustment for the photographic lens 2 ends and the shutter speed is determined. Subsequently, the control circuit 31 causes the sequence motor 4 to rotate forward. After the sequence motor 4 rotates to the point at which the rotational angle of the camshaft 172, initially in the G range, shifts into the E range through the F range, the control circuit 31 temporarily stops the sequence motor 4 (see FIG. 16).

Figure 16:
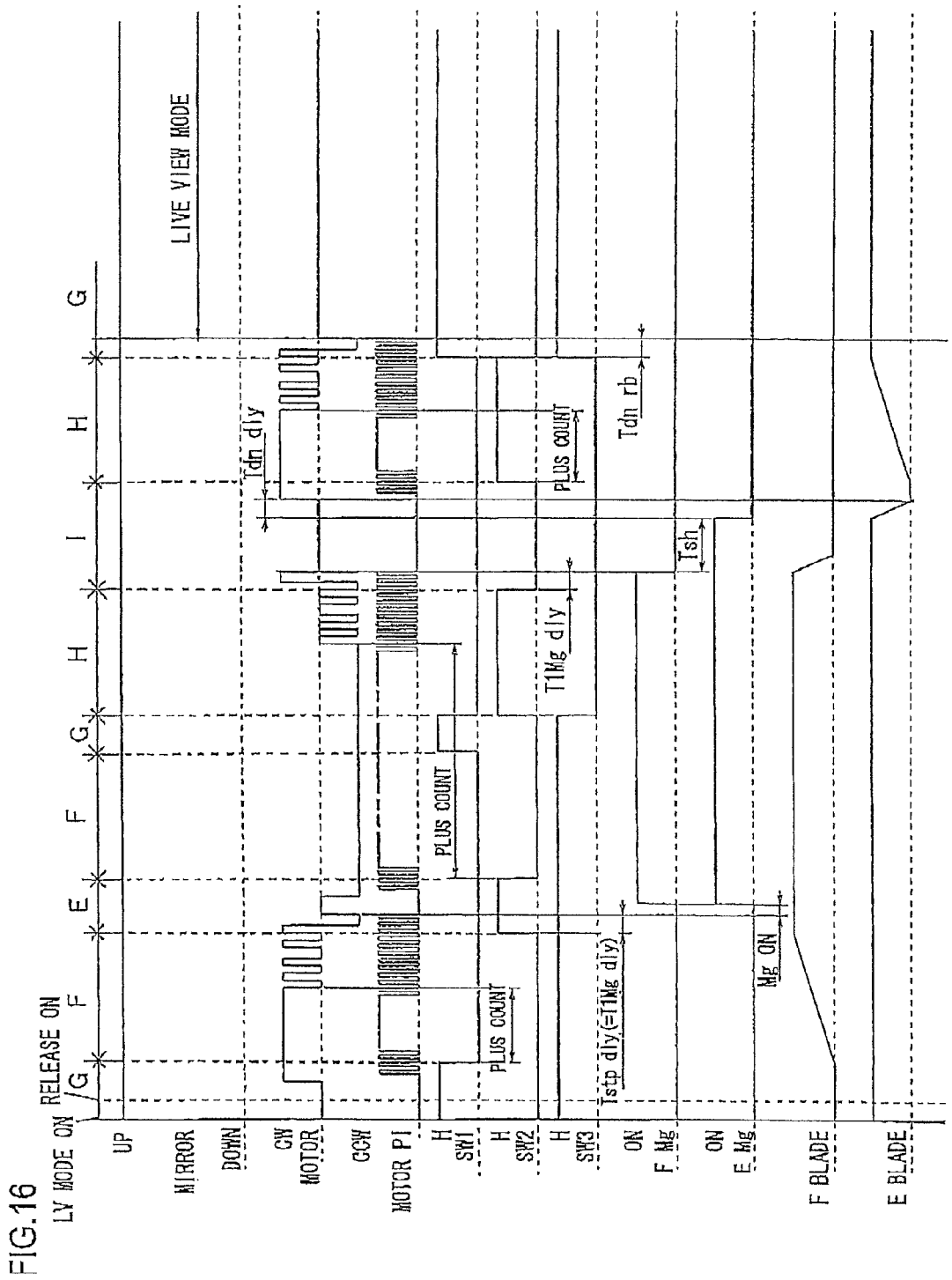
FIG. 16 presents a camera body sequence chart.
Figure 17:
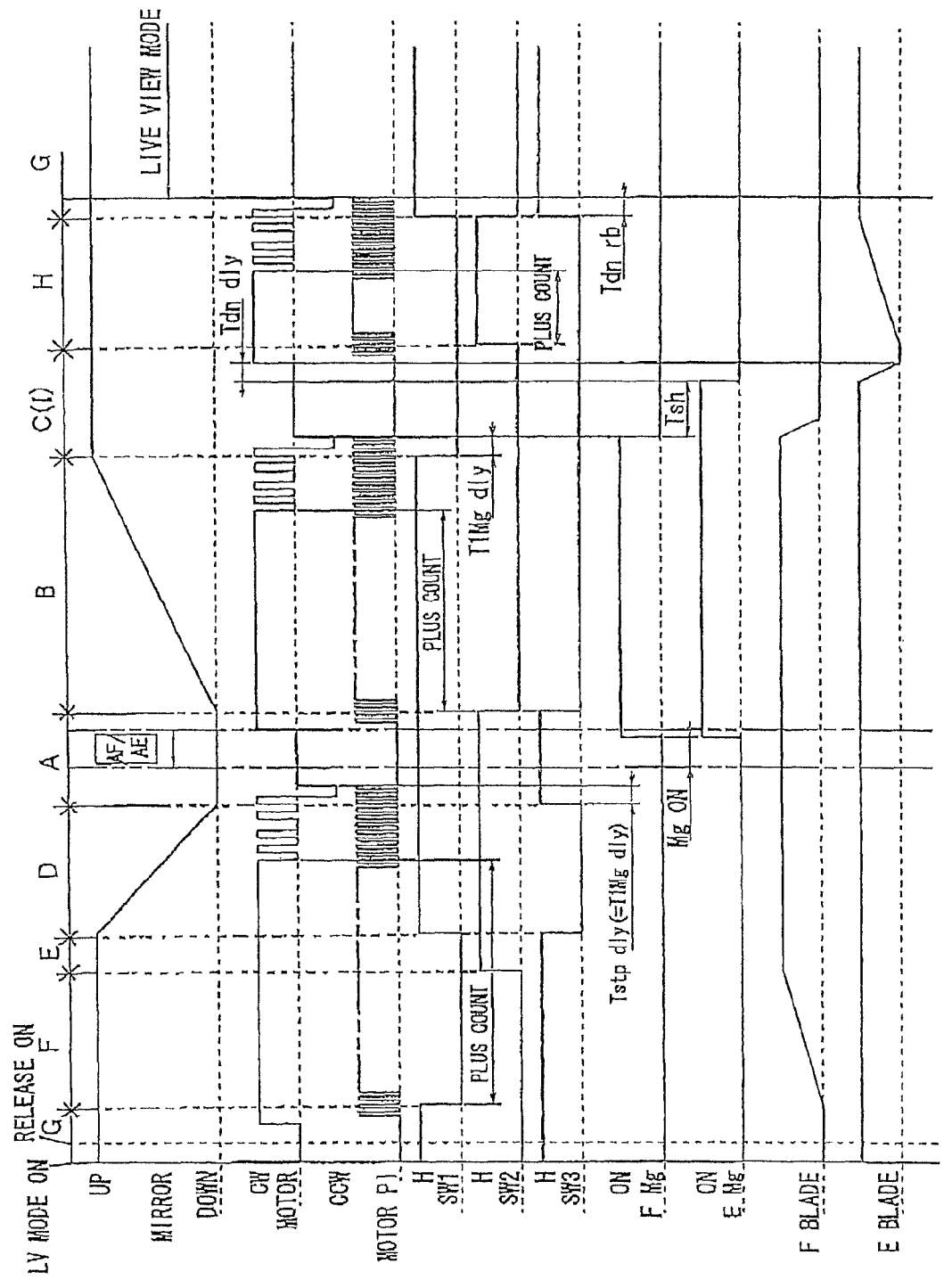
FIG. 17 presents a camera body sequence chart.
Figure 18:
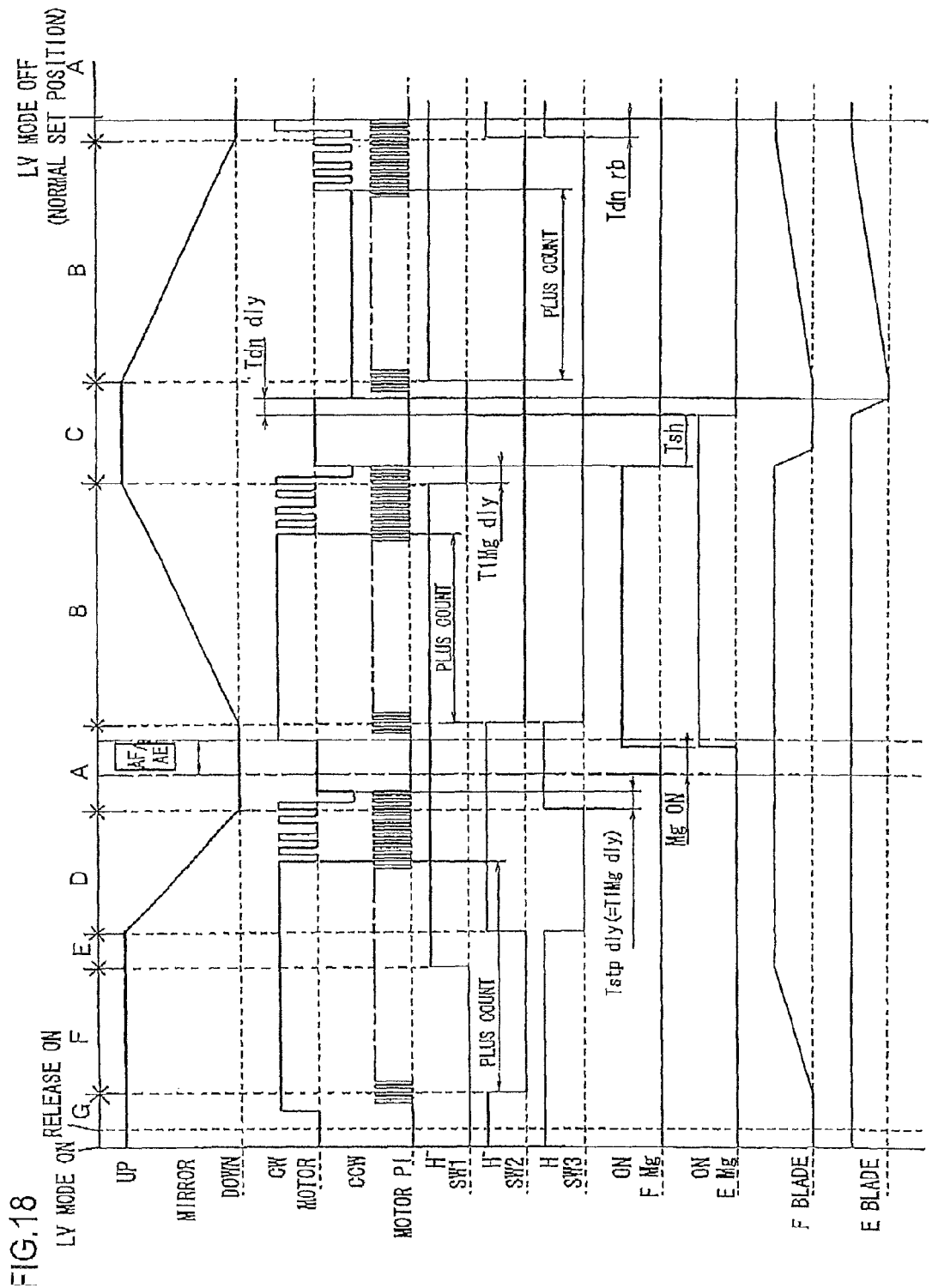
FIG. 18 presents a camera body sequence chart.

The front curtain charge cam 121 rotates so as to increase the lift quantity to its largest before it stops (see FIGS. 11 and 16). While the rotational angle of the cam shaft 172 is within the F range, the lift quantity of the front curtain charge cam 121 gradually increases as the cam shaft 172 continues to rotate forward. Thus, the front curtain charge cam lever 123 is caused to rotate clockwise around the shaft 111c, viewed from the left side of the camera body 1. Consequently, the front curtain shielding blade set 411 is reset (shutter charged) (see FIG. 16).

It is to be noted that since the lift quantities of the rear curtain charge cam 122 and the mirror drive cam 151 both remain unchanged, the rear curtain shielding blade set 431 sustains the reset state and the main mirror 11 does not move away from the retreat position. In addition, since the lift quantity of the aperture control lever drive cam 152 remains unchanged, the aperture at the photographic lens 2 is not set in the open state, and until the live view mechanical shutter photographing mode is cleared, the aperture at the photographic lens 2 sustains the constricted state having been set in the live view mechanical shutter photographing mode.

As the rotational angle of the cam shaft 172 shifts into the E range, the control circuit 31 temporarily stops the sequence motor 4. It then excites the front curtain magnet 143 and the rear curtain magnet 144. As a result, the front curtain magnet 143 and the rear curtain magnet 144 respectively attract and hold fast the magnetically attracted portion 141e of the front curtain drive lever 141 and the magnetically attracted portion 142e of the rear curtain drive lever 142 in contact with the front curtain magnet and the rear curtain magnet. Subsequently, the control circuit 31 causes the sequence motor 4 to rotate backward and, as the rotational angle of the cam shaft 172, initially in the E range, shifts into the I range through the F~H ranges, it stops the sequence motor 4 (see FIG. 16).

The front curtain charge cam 121 rotates so as to reduce the lift quantity to its smallest before it stops (see FIGS. 11 and 16). As explained earlier, while the rotational angle of the cam shaft 172 is within the F range, the lift quantity of the front curtain charge cam 121 gradually decreases as the cam shaft 172 continues to rotate backward. Thus, the force applied by the spring (not shown) causes the front curtain charge cam lever 123 to rotate counterclockwise around the shaft 111c, viewed from the left side of the camera body 1 and, as a result, the front curtain drive lever contact portion 123b is pulled down. However, since the magnetically attracted portion 142e of the front curtain drive lever 143 is held fast onto the front curtain magnet 143, the front curtain drive lever 141 sustains the stationary state at the position to which it has rotated counterclockwise, viewed from the front side of the camera body 1, against the force applied by the spring 145. Namely, the front curtain shielding blade set 411 in the stationary state shields the photographic opening 461 (see FIG. 16).

The rear curtain charge cam 122 rotates so as to reduce the lift quantity to its smallest before it stops (see FIG. 11). As explained earlier, while the rotational angle of the cam shaft 172 is within the H range, the lift quantity of the rear curtain charge cam 122 gradually decreases as the cam shaft 172 continues to rotate backward. Thus, the force applied by the spring (not shown) causes the rear curtain charge cam lever 124 to rotate counterclockwise around the shaft 111d, viewed from the left side of the camera body 1 and, as a result, the rear curtain drive lever contact portion 124b is pulled down. However, since the magnetically attracted portion 142e of the rear curtain drive lever 142 is held fast onto the rear curtain magnet 144, the rear curtain drive lever 142 sustains the stationary state at the position to which it has rotated counterclockwise, viewed from the front side of the camera body 1, against the force applied by the spring 146. Namely, the rear curtain shielding blade set 431 assumes the stationary state at the retreat position above the photographic opening 461 (see FIG. 16).

It is to be noted that since the lift quantity of the mirror drive cam 151 remains unchanged, the main mirror 11 does not move away from the retreat position. In addition, since the lift quantity of the aperture control lever drive cam 152 remains unchanged, the aperture at the photographic lens 2 is not set in the open state, and until the live view mechanical shutter photographing mode is cleared, the aperture at the photographic lens 2 sustains the constricted state having been set in the live view mechanical shutter photographing mode.

Once the rotational angle of the cam shaft 172 shifts into the I range, the control circuit 31 stops the sequence motor 4. It then stops the power supply to the exciting coil of the front curtain magnet 143. Consequently, the front curtain shielding blade set 411 moves over the photographic opening 461 in the front case 460 downward to unshield the photographic opening 461. At this stage, the rear curtain shielding blade set 431, assuming the retreat position above the photographic opening 461, remains in the stationary state.

The imaging operation is executed by controlling the electrical charge storage at the image sensor 3 while the photographic opening 461 is unshielded. Once the electrical charge storage, executed over the length of time corresponding to the shutter speed having been determined as explained earlier, ends, the control circuit 31 stops the power supply to the exciting coil of the rear curtain magnet 144. Thus, the rear curtain shielding blade set 431 is caused to move downward over the photographic opening 461 in the front case 460 to shield the photographic opening 460. In the live view mechanical shutter photographing mode, the length of time over which the electrical charges are stored at the image sensor 3 is controlled via the mechanical shutter as described above. It is to be noted that the aperture at the photographic lens 2 sustains, throughout the photographing operation executed in the live view mechanical shutter photographing mode, the constricted state set when the live view mechanical shutter photographing mode is selected, as described earlier. Thus, the exposure quantity is optimally adjusted based upon the shutter speed.

Immediately upon completion of the photographing operation described above, the following operation is executed so as to bring the through image back up on display at the rear-side display monitor 7. The control circuit 31 rotates the sequence motor 4 forward and once the sequence motor has rotated to the point at which the rotational angle of the cam shaft 172, having shifted out of the I range, ultimately shifts into the G range through the H range, the control circuit 31 stops the sequence motor 4 (see FIG. 16). Since the operations of the individual units executed at this time are similar to those having been described earlier in "(2-3) When the shutter release button is pressed in the live view mode", a repeated explanation is not provided.

As the rotational angle of the cam shaft 172 shifts into the G range, the control circuit 31 stops the sequence motor 4. It then controls the various units so as to display the through image at the rear-side display monitor 7. The through image is thus brought back up on display at the rear-side display monitor 7. In addition, the control circuit 31 resumes the focus adjustment for the photographic lens 2 and the shutter speed calculation.

(4) Photographing Operation Similar to Normal Photographing Mode Operation Preceded by and Succeeded by Through Image Display (Live View-in Progress Normal Photographing Mode)

As a live view-in progress normal photographing mode is selected as the photographing mode while the through image is up on display, the camera achieved in the embodiment is enabled to execute a photographing operation similar to that executed in the normal photographing mode and then the through image is brought back up on display without having to execute a reset operation, which is required in the normal photographing mode.

The operation executed at the camera body 1 in the live view-in progress normal photographing mode is outlined below. Namely, once the live view-in progress normal photographing mode is selected as the photographing mode, an operation similar to that described in "(2-1) When live view mode is on" is executed and the through image is brought up on display at the rear-side display monitor 7. As the shutter release button is pressed all the way down in this state, an operation similar to that described in "(2-2) When the live view mode is off (when the normal photographing mode is selected)" is executed and the camera body 1 enters a state identical to the photographing standby state in the normal photographing mode. Subsequently, the shutter release operation and the photographing operation described in "(1) Normal photographing operation (normal photographing mode)" are executed. However, following the shutter release operation and the photographing operation, an operation similar to that executed following the end of the photographing operation, as has been described in "(2-3) When the shutter release button is pressed in the live view mode", is executed instead of the reset operation executed in the normal photographing mode. The control executed in this mode is now described in reference to FIGS. 11, 14 and 17.

As the photographing mode is switched from, for instance, the normal photographing mode to the live view-in progress normal photographing mode, the control circuit 31 causes the sequence motor 4 to rotate backward and allows the sequence motor to keep rotating until the rotational angle of the cam shaft 172, initially in the A range, shifts into the G through the D F ranges before stopping the sequence motor 4, in much the same way as it does in "(2-1) When live view mode is on" (see FIGS. 11 and 14). In addition, after stopping the sequence motor 4, the control circuit 31 controls the various units so as to display the through image at the rear-side display monitor 7. The through image is thus brought up on display at the rear-side display monitor 7. It is to be noted that the control circuit 31, which repeatedly executes the focus adjustment for the photographic lens 2 through image plane AF so as to adjust the focus of the through image while the through image is up on display as it does in "(2-1) When live view mode is on" described earlier, does not execute the arithmetic operation to calculate the shutter speed at this point in time.

As the shutter release button (not shown) is pressed all the way down and a full press operation signal is input from the full press switch (not shown) in response, the control circuit 31 ends the image plane AF and halts the through image display at the rear-side display monitor 7. In addition, in much the same way as has been described in "(2-2) When the live view mode is off (when the normal photographing mode is selected)", the control circuit 31 causes the sequence motor 4 to rotate forward and once the sequence motor 4 rotates to a point at which the rotational angle of the cam shaft 172, initially in the G range as explained earlier, shifts into the A range through the F~D ranges, it temporarily stops the sequence motor 4 (see FIGS. 11 and 17). At this point in time, the camera body 1 assumes a state identical to the pre-shutter release start state in the normal photographing mode.

As the rotational angle of the cam shaft 172 shifts into the A range while the sequence motor 4 is still in the temporarily halted state, the control circuit 31 executes arithmetic operation to calculate the control aperture value and the shutter speed and also executes rangefinding calculation as it does when a halfway press operation signal is input thereto in the normal photographing mode. These arithmetic operations are executed in the block marked AE/AF in the A range in FIG. 17. Namely, the control circuit 31 executes photometering operation of the known art based upon the brightness of the subject detected via the photometering unit 5 and calculates the control aperture value and the shutter speed while the sequence motor 4 is still in the temporarily halted state. In addition, the control circuit 31 executes rangefinding calculation of the known art based upon the focus detection results provided from the AF unit 6 and adjusts the focusing condition at the photographic lens 2. Following the photometering and rangefinding calculations, the control circuit 31 controls the individual units at the camera body 1 so as to execute a shutter release operation and a photographing operation (main photographing operation) in the normal photographing mode, as it does when a full press operation signal is input thereto in the normal photographing mode.

At the completion of the shutter release operation and the photographing operation, the rotational angle of the cam shaft 172 will have shifted into the C range, i.e., the I range. Once the shutter release operation and the photographing operation described above end, the control circuit 31 immediately causes the sequence motor 4 to rotate forward and allows the sequence motor 4 to rotate until the rotational angle of the cam shaft 172, having shifted out of the I range into the H range, enters the G range before stopping the sequence motor 4 (see FIGS. 11 and 17). At this time, an operation similar to that executed at the end of the photographing operation having been described earlier in "(2-3) When the shutter release button is pressed in the live view mode", is executed.

It is to be noted that the lift quantity of the aperture control lever drive cam 152 remains unchanged as the rotational angle of the cam shaft 172, initially in the I range, shifts into the G range. Thus, the aperture at the photographic lens 2 is not set in the open state, and sustains the constricted state having been set for the main photographing operation mentioned earlier, until the live view-in progress normal photographing mode is cleared or until the shutter release button (not shown) is pressed all the way down again. In addition, since the lift quantities of the front curtain charge cam 121 and the mirror drive cam 151 both remain unchanged, the front curtain shielding blade set 411 is not reset and the main mirror 11 does not move away from the retreat position. In other words, after the photographing operation ends, the front curtain shielding blade set 411 does not shield the photographic opening 461 and the main mirror 11 remains in the mirror up state until the through image display is resumed.

As the rotational angle of the cam shaft 172 shifts into the G range, the control circuit 31 stops the sequence motor 4 and then controls the various units so as to display the through image at the rear-side display monitor 7. The through image is thus brought up on display at the rear-side display monitor 7. In addition, the control circuit 31 resumes the focus adjustment for the photographic lens 2 described earlier.

As described above, the photographing sequence is executed without the cam shaft 172 rotating backward in the live view-in progress normal photographing mode. It is to be noted that while the rotational angle of the camshaft 172 is in the C(I) range at the end of the photographing operation, the rotational angle of the cam shaft 172 is in the G range in the pre-photographing start state in the live view-in progress normal photographing mode. The cam shaft 172, the rotational angle of which is in the C range does not need to rotate as much to set the rotational angle in the G range if it rotates forward rather than backward. Accordingly, the cam shaft 172 is caused to rotate forward in order to reenter the pre-photographing start state upon ending the photographing operation in the live view-in progress normal photographing mode so as to recover the pre-photographing start state more quickly.

In addition, if the cam shaft 172 was caused to rotate backward, it would be necessary to first reset the front curtain shielding blade set 411 and then cause it to run again to bring up the through image display. It would also be necessary, in order to bring up the through image display, to first lower the main mirror 11 and then raise the mirror again. In contrast, the front curtain shielding blade set 411 is not reset and the main mirror 11 is not lowered as the cam shaft 172 rotates forward, eliminating any superfluous operation.

(5) Photographing Operation Similar to Normal Photographing Mode Operation, Preceded by the Through Image Display and Executed Before Shifting into Photographing Standby State in the Normal Photographing Mode (Post-Live View Normal Photographing Mode)

As a post-live view normal photographing mode is selected as the photographing mode while the through image display is up, the camera achieved in the embodiment is enabled to execute a photographing operation similar to the photographing operation executed in the normal photographing mode and then execute a reset operation in the normal photographing mode.

The operation executed at the camera body 1 in the post-live view normal photographing mode is outlined below. Namely, once the post-live view normal photographing mode is selected as the photographing mode, an operation similar to that described in "(2-1) When live view mode is on" is executed and the through image is brought up on display at the rear-side display monitor 7. As the shutter release button is pressed all the way down in this state, an operation similar to that described in "(2-2) When the live view mode is off (when the normal photographing mode is selected)" is executed and the camera body 1 enters a state identical to the photographing standby state in the normal photographing mode. Subsequently, the shutter release operation and the photographing operation described in "(1) Normal photographing operation (normal photographing mode)" are executed at the camera body 1.

Namely, once the camera is set in the post-live view normal photographing mode, an operation similar to that executed up to the time point at which the photographing operation in the live view-in progress normal photographing mode described above ends, is executed. Subsequently, unlike in the live view-in progress normal photographing mode, the reset operation in the normal photographing mode is executed. The control executed in this mode is now described in reference to FIGS. 11, 14 and 18.

As the photographing mode is switched from, for instance, the normal photographing mode to the post-live view normal photographing mode, the control circuit 31 causes the sequence motor 4 to rotate backward and allows the sequence motor to keep rotating until the rotational angle of the cam shaft 172, initially in the A range, shifts into the G through the D~F ranges before stopping the sequence motor 4, in much the same way as it does in "(2-1) When live view mode is on" (see FIGS. 11 and 14). In addition, after stopping the sequence motor 4, the control circuit 31 controls the various units so as to display the through image at the rear-side display monitor 7. The through image is thus brought up on display at the rear-side display monitor 7. It is to be noted that the control circuit 31, which repeatedly executes the focus adjustment for the photographic lens 2 through image plane AF so as to adjust the focus of the through image while the through image is up on display as it does in the live view-in progress normal photographing mode described earlier, does not execute the arithmetic operation to calculate the shutter speed at this point in time.

As the shutter release button (not shown) is pressed all the way down and a full press operation signal is input from the full press switch (not shown) in response, the control circuit 31 ends the image plane AF and halts the through image display at the rear-side display monitor 7. In addition, in much the same way as has been described in "(2-2) When the live view mode is off (when the normal photographing mode is selected)", the control circuit 31 causes the sequence motor 4 to rotate forward and once the sequence motor 4 rotates to a point at which the rotational angle of the cam shaft 172, initially in the G range as explained earlier, shifts into the A range through the F~D ranges, it temporarily stops the sequence motor 4 (see FIG. 18). At this point in time, the camera body 1 assumes a state identical to the pre-shutter release start state in the normal photographing mode.

As the rotational angle of the cam shaft 172 shifts into the A range while the sequence motor 4 is still in the temporarily halted state, the control circuit 31 executes arithmetic operation to calculate the control aperture value and the shutter speed and also executes rangefinding calculation as it does when a halfway press operation signal is input thereto in the normal photographing mode. These arithmetic operations are executed in the block marked AE/AF in the A range in FIG. 18. Namely, the control circuit 31 executes photometering operation of the known art based upon the brightness of the subject detected via the photometering unit 5 and calculates the control aperture value and the shutter speed while the sequence motor 4 is still in the temporarily halted state. In addition, the control circuit 31 executes rangefinding calculation of the known art based upon the focus detection results provided from the AF unit 6 and adjusts the focusing condition at the photographic lens 2. Following the photometering and rangefinding calculations, the control circuit 31 controls the individual units at the camera body 1 so as to execute a shutter release operation and a photographing operation (main photographing operation) in the normal photographing mode, as it does when a full press operation signal is input thereto in the normal photographing mode.

At the completion of the shutter release operation and the photographing operation, the rotational angle of the cam shaft 172 will have shifted into the C range. Once the shutter release operation and the photographing operation described above end, the control circuit 31 immediately causes the sequence motor 4 to rotate backward and allows the sequence motor 4 to rotate until the rotational angle of the cam shaft 172, having shifted out of the C range into the B range, ultimately enters the A range before stopping the sequence motor 4 (see FIG. 18). At this time, an operation similar to the reset operation described in "(1) Normal photographing operation (normal photographing mode)" is executed.

Once the rotational angle of the cam shaft 172 shifts into the A range, the control circuit 31 stops the sequence motor 4. In addition, the control circuit 31 selects the normal photographing mode as the photographing mode. In other words, each time the main photographing operation in the post-live view normal photographing mode is completed, the photographing mode is reset to the normal photographing mode. It is to be noted that while the rotational angle of the cam shaft 172 is in the C(I) range at the end of the photographing operation sequence, the rotational angle of the cam shaft 172 is in the A range at the end of the photographing sequence executed in the post-live view normal photographing mode. The cam shaft 172, the rotational angle of which is in the C range does not need to rotate as much to set the rotational angle in the A range if it rotates backward rather than forward. Accordingly, the cam shaft 172 is caused to rotate backward in order to end the photographing sequence more quickly at the end of the photographing operation in the post-live view photographing mode.

The camera in the embodiment described above achieves the following advantages.

(1) The camera assumes a structure that allows the front curtain charge cam 121 and the rear curtain charge cam 122 to rotate as one together with the cam shaft 172 and allows the front curtain shielding blade set 411 and the rear curtain shielding blade set 431 to be reset individually in correspondence to the rotational angle of the cam shaft 172. As a result, better versatility is assured in the control of the operations of the front curtain shielding blade set 411 and the rear curtain shielding blade set 431.

For instance, in the live view mode, the front curtain shielding blade set 411 is allowed to shift into the running-enabled state (i.e., the state in which the lift quantity of the front curtain charge cam 121 is at its smallest) while sustaining the charged state at the rear curtain shielding blade set 431 (i.e., the state in which the lift quantity of the rear curtain charge cam 122 is at its largest), by rotating the cam shaft 172 so that its rotational angle shifts from the A range into the G range. In addition, when the live view mode is cleared, the front curtain shielding blade set 411 is allowed to shift into a charged state (i.e., the state in which the lift quantity of the front curtain charge cam 121 is at its largest) while sustaining the charged state at the rear curtain shielding blade set 431 (i.e., the state in which the lift quantity of the rear curtain charge cam 122 is at its largest), by rotating the cam shaft 172 so that its rotational angle shifts from the G range into the A range.

Under this control, the front curtain shielding blade set 411 alone can be engaged in a running operation or can be charged without engaging the rear curtain shielding blade set 431 in a running operation. In other words, the rear curtain shielding blade set 431, which does not need to be engaged in operation when the live view mode is set or cleared, is allowed to remain stationary, which helps reduce the length of time required to set or clear the live view mode. Ultimately, a camera assuring superior operation response is provided. In addition, since the rear curtain shielding blade set 431, which does not need to be engaged in operation when the live view mode is selected or cleared, is allowed to remain stationary, the service life of the rear curtain shielding blade set 431, its drive mechanism and the charge mechanism can be extended, and the power consumption is minimized by reducing the required drive motor force. Moreover, since the extent of dust manifesting as the movable parts move is reduced, degradation in image quality attributable to dust is minimized.

(2) As the shutter release button is pressed in the live view mode, the rotational angle of the cam shaft 172, initially in the G range, shifts into the H range and then enters the I range, and once the imaging operation is executed, the rotational angle shifts out of the I range into the H range and then enters the G range. Namely, the cams 121 and 122, assuming lift quantities that respectively set the front curtain shielding blade set 411 in the running-enabled state and the rear curtain shielding blade set 431 in the charged state (G range), are adjusted so as to set both the front curtain shielding blade set 411 and the rear curtain shielding blade set 431 in the running-enabled state (I range). In addition, the cams 121 and 122, assuming the lift quantities that set both the front curtain shielding blade set 411 and the rear curtain shielding blade set 431 in the running-enabled state (I range), are adjusted so as to sustain the front curtain shielding blade set 411 in the running-enabled state and shift the rear curtain shielding blade set 431 into the charged state (G range), without having to set the front curtain shielding blade set 411 in the charged state (A, D and E ranges). Thus, during the photographing operation executed in the live view mode, the rear curtain shielding blade set 431 can be engaged in a running operation or can be charged by itself without having to charge the front curtain shielding blade set 411, which does not need to be charged. Consequently, the photographing cycle time of the photographing operation executed in the live view mode can be reduced, which ultimately makes it possible to provide a camera assuring excellent continuous shooting performance.

In addition, since the front curtain shielding blade set 411, which does not need to be engaged in operation during the photographing operation in the live view mode, is allowed to remain stationary, the service life of the front curtain shielding blade set 411, its drive mechanism and its charge mechanism can be extended, and the power consumption is minimized by reducing the required drive motor force. Moreover, since the extent of dust manifesting as the movable parts move is reduced, degradation in image quality attributable to dust is minimized.

(3) When the normal photographic mode or the post-live view normal photographic mode is set, control is executed so that the rotational angle of the cam shaft 172 shifts out of the A range into the B range and then enters the C range during the main photographing operation and that once the main photographing operation is completed, the rotational angle shifts out of the C range into the B range and then enters the A range. Namely, the cams 121 and 122 having been controlled to charge the front curtain shielding blade set 411 and the rear curtain shielding blade set 431 (A range), are adjusted so that the contact portions of the cam faces gradually move away from the charge cam levers 123 and 124 (B range) and then the front curtain shielding blade set 411 and the rear curtain shielding blade set 431 shift into the running-enabled state (C range). In addition, following the main photographing operation, the cams, having been controlled to set the front curtain shielding blade set 411 and the rear curtain shielding blade set 431 in the running-enabled state (C range), are adjusted so that the contact portions of the cam faces gradually push toward the charge cam levers 123 and 124 along the charging direction and the front curtain shielding blade set 411 and the rear curtain shielding blade set 431 shift into the charged state (A range). Thus, the front curtain shielding blade set 411 and the rear curtain shielding blade set 431 are together set in the running-enabled state or are charged. Consequently, a photographing sequence similar to that of cameras in the related art is enabled, which, in turn, makes it possible to assure photographing functions and operational ease comparable to those of the cameras in the related art.

(4) Regardless of whether the cam shaft 172 rotates forward or backward, its rotational angle is allowed to shift into the C(I) range, in which both the front curtain shielding blade set 411 and the rear curtain shielding blade set 431 assume the running-enabled state. In addition, the subject image is captured while the rotational angle of the cam shaft 172 is in the C(I) range. Consequently, the front curtain shielding blade set 411 and the rear curtain shielding blade set 431 can both be set in the running-enabled state in correspondence to a specific photographing mode having been selected while keeping any superfluous operations to a minimum, making it possible to reduce the photographing cycle time, which, in turn, makes it possible to provide a camera with a high level of continuous shooting performance. In addition, since any member that does not need to move remains stationary, the service life of the individual movable parts is extended, and the power consumption is minimized by reducing the required drive motor force. Moreover, since the extent of dust manifesting as the movable parts move is reduced, degradation in image quality attributable to dust is minimized.

While the rotational angle of the cam shaft 172 is within the D range, the lift quantity of the mirror drive cam 151 gradually decreases as the cam shaft 172 continues to rotate backward to move the main mirror 11 to the retreat position. While the rotational angle of the cam shaft 172 is within the D range, the lift quantity of the mirror drive cam 151 gradually increases as the cam shaft 172 continues to rotate forward to move the main mirror 11 to the observation position. In addition, while the rotational angle of the cam shaft 172 is within the A, D or E range, the front curtain shielding blade set 411 and the rear curtain shielding blade set 431 are charged. As a result, as the shutter release button is pressed all the way down in the live view mechanical shutter photographing mode, the main mirror 11 holds at the retreat position even if the front curtain shielding blade set 411 is charged. Consequently, at the start of the main photographing operation in the live view mechanical shutter photographing mode, the front curtain shielding blade set 411 can be charged without having to unnecessarily lower the main mirror 11 (and without having to subsequently raise the mirror unnecessarily). In addition, during the reset operation following the main photographing operation executed in the live view mechanical shutter photographing mode, the front curtain shielding blade set 411 and the rear curtain shielding blade set 431 can be charged without having to unnecessarily lower the main mirror 11 (and without having to subsequently raise the mirror unnecessarily). As a result, the photographing cycle time of the photographing operation executed in the live view mechanical shutter photographing mode can be reduced, which, in turn, makes it possible to provide a camera assuring a high level of continuous shooting performance. In addition, since the main mirror 11, which does not need to be engaged in operation during the photographing operation in the live view mechanical shutter photographing mode, is allowed to remain stationary, the service life of the main mirror 11, its drive mechanism and its charge mechanism can be extended, and the power consumption is minimized by reducing the required drive motor force. Moreover, since the extent of dust manifesting as the movable parts move is reduced, degradation in image quality attributable to dust is minimized.

(6) As the rotational angle of the cam shaft 172 shifts out of the A range into the B range and then enters the C range during the photographing operation executed in the normal photographing mode or the post-live view normal photographing mode, the magnets 143 and 144 are excited so as to attract and hold fast the respective magnetically attracted portions 141*e* and 142*e* in contact with the magnets. Then, when the image sensor 3 is engaged in an imaging operation, the power supply to the exciting coil of the magnet 143 and the power supply to the exciting coil of the magnet 144 are stopped in sequence. Through these measures, the shutter speed can be accurately controlled, making it possible to obtain an image assuming the desired brightness level.

(7) In order to bring up the through image display, the cam shaft 172 is caused to rotate until its rotational angle shifts into the G range so as to set the front curtain shielding blade set 411 in the running-enabled state while sustaining the rear curtain shielding blade set 431 in the charged state, without supplying power to the exciting coils of the magnets 143 and 144. The front curtain shielding blade set 411 thus unshields the photographic opening 461 and the rear curtain shielding blade set 431 retreats to a position above the photographic opening 461. Since these measures enable the through image display without having to supply power to the exciting coils of the magnets 143 and 144, the power consumption is minimized and the number of images that can be captured can be maximized.

(8) The shielding blade sets 411 and 431 are disposed at the shielding curtain mechanism 400 and the drive mechanisms that drive the shielding blade sets 411 and 431 are installed at the sequence shutter drive unit 100. In other words, the shielding blade sets 411 and 431 and the drive mechanisms that drive the shielding blade sets 411 and 431 are disposed at separate installation locations. This structure facilitates any modification of the specifications of specifically the sequence shutter drive unit 100 alone or specifically the shielding curtain mechanism 400 alone, i.e., facilitates specifications modification (design modification) in part of the shutter device, which, in turn, makes it possible to install the sequence shutter drive unit 100 and the shielding curtain mechanism 400 in various cameras. Since the sequence shutter drive unit 100 and the shielding curtain mechanism 400 can be installed in diverse types of cameras without requiring extensive design modification or the like, the length of time required for design work or production preparation can be reduced. Furthermore, the design cost and the manufacturing cost can both be reduced.

(9) In the sequence shutter drive unit 100 and the shielding curtain mechanism 400 achieved in the embodiment, the front curtain drive lever holding pin 181, the rear curtain drive lever holding pin 182, the front curtain follower arm support pin 183 and the rear curtain follower arm support pin 184, respectively constituting the rotational axes of the arms 421, 422, 441 and 442, which affect the operational accuracy of the shielding blade sets 411 and 431, e.g., the traveling loci and the stop positions of the shielding blade sets 411 and 431, are all mounted at the second base plate 112. Namely, the pins 181~184, which affect the operational accuracy of the shielding blade sets 411 and 431, are all positioned at the sequencing base plate set 110. As a result, the required level of operational accuracy of the shielding blade sets 411 and 431 can be assured via the sequence shutter drive unit 100. Namely, the shielding curtain mechanism 400 does not require a substrate assuring significant rigidity, such as that required in shutter devices in the related art, for the installation of the pins constituting the rotational axes of the rotary arms for the shielding blade sets. Consequently, since the front case 460 and the rear cover 470 can be manufactured by using a less rigid material with less rigorous control required to assure manufacturing accuracy, compared to those in the shutter devices in the related art, the profile of the shielding curtain mechanism 400, measured along the front/rear direction, can be reduced. This, in turn, contributes to miniaturization of the camera (camera body 1).

It is to be noted that as long as the front case 460 and the rear cover 470 assure the required level of shielding performance, they do not need to be mounted at the second base plate 112 with an accuracy level as high as the accuracy level that must be assured when the shutter device is mounted at the mirror box in the related art. Thus, the front case 460 and the rear cover 470 can be manufactured and assembled at lower cost.

(10) The sequence shutter drive unit 100 and the shielding curtain mechanism 400 in the embodiment are assembled by ensuring that the rotational centers of the front curtain main arm 421 and the rear curtain main arm 441 are aligned with the rotational centers of the front curtain drive lever 141 and the rear curtain drive lever 142 which respectively drive the front curtain main arm 421 and the rear curtain main arm 441. Thus, smooth rotation of the front curtain main arm 421 and the rear curtain main arm 441 is assured and, at the same time, the efficiency with which motive force is transmitted from the front curtain drive lever 141 and the rear curtain drive lever 142 to the front curtain main arm 421 and the rear curtain main arm 441 improves. Consequently, the service life of the front curtain main arm 421 and the rear curtain main arm 441 can be extended and the noise and power consumption can be reduced.

(11) The components that drive the main mirror 11, the aperture at the photographic lens 2, the shielding blade sets 411 and 430 and the like are disposed at the first base plate 11 and the second base plate 112 ranging perpendicular to each other. Thus, the levers 123~125, 153 and 154, the gears 126 and 131, the cams 121, 122, 151 and 152 and the like, which rotate around rotational axes invariably ranging to the left/right of the camera body 1, and the drive levers 141 and 142, the rotational axes of which range to the front/rear of the camera body 1, can be installed in a compact arrangement. As a result, the camera (the camera body 1) can be provided as a compact unit.

Variations (1) While an explanation is given above on an example in which the main photographing operation is executed in the live view mode, the live view mechanical shutter photographing mode or the live view-in progress normal photographing mode without altering the current mode setting, the present invention is not limited to this example. For instance, as the main photographing operation is executed in the live view mode, the live view mechanical shutter photographing mode or the live view-in progress normal photographing mode, the camera may be automatically reset to the normal photographing mode.

(2) While an explanation is given above on an example in which the C range and the I range assumed for the rotational angle of the cam shaft 172 are actually the same angle range, the present invention is not limited to this example. For instance, the C range and the I range may be different angle ranges. In addition, while no particular restrictions are imposed with regard to the rotational range of the cam shaft 172, the rotational range of the cam shaft 172 may be limited to a specific range, e.g., from 0°~360°.

(3) While the front curtain shielding blade set 411 and the rear curtain shielding blade set 431 described above are each constituted with three blades, the number of blades to constitute each shielding blade set is not limited to three. In other words, two or fewer blades or four or more blades may constitute each shielding blade set. In addition, while the shielding curtain mechanism 400 described above includes two sets of shielding blades, i.e., the front curtain shielding blade set 411 and the rear curtain shielding blade set 431, the shielding curtain mechanism may instead include a single set of shielding blades. It is to be noted that the explanation provided above simply describes the basic structure and that a braking mechanism, an X switch, a shutter monitor and the like of the known art may be disposed at the sequence shutter drive unit 100 or the shielding curtain mechanism 400.

(4) The technical aspects of the embodiment and the variations described above may be adopted in combination.

It is to be noted that the present invention is by no means limited to the embodiment described above, and that it may be adopted in any of cameras assuming various structures, provided that the camera comprises an image sensor that captures a subject image, a first shutter blade set and a second shutter blade set that open/close to assume an open state in which the subject image is guided to the image sensor or a closed state in which the image sensor is shielded, a first charge member that charges a first drive force used to drive the first shutter blade set, a second charge member that charges a second drive force to be used to drive the second shutter blade set, a first cam having formed therein a first drive force charge cam face that comes in contact with the first charge member to displace the first charge member along a charging direction so as to charge the first drive force, a second cam having formed therein a second drive force charge cam face that comes in contact with the second charge member to displace the second charge member along the charging direction so as to charge the second drive force, a third cam having formed therein a cam face so as to drive a mirror to adopt either of two positions, i.e. a down position assumed within a photographic optical path so as to guide the subject image to a viewfinder and an up position assumed out of the photographic optical path to guide the subject image to the image sensor, a rotating shaft with the first through third cams fixed thereupon, which causes the first through third cams to rotate as one. In such a camera, the first cam is rotated to assume a rotational phase at which drive of the first shutter blade set with the first drive force is not hindered and the second drive force charge cam face in contact with the second charge member charges the second drive force as the rotating shaft is caused to rotate to a first rotational phase, the second drive force charge cam in contact with the second charge member sustaining the second drive force charging state during a transition period in which the rotating shaft in the first rotational phase rotates to a second rotational phase, and the first drive force charge cam face in contact with the first charge member charges the first drive force and the second drive force charge cam face in contact with the second charge member charges the second drive force as the rotating shaft is caused to rotate from the first rotational phase to the second rotational phase.

In the embodiment described above, the first drive force used to drive the first shutter blade set and the second drive force used to drive the second shutter blade set can be individually charged in correspondence to the rotational phase of the rotating shaft, assuring versatility in the control under which the shutter blade sets are engaged in operation.

The above described embodiment is an example and various modifications can be made without departing from the scope of the invention.

What is claimed is:

1. A camera comprising:
    an image sensor that captures a subject image;
    a first shutter blade set and a second shutter blade set that open/close to assume an open state in which the subject image is guided to the image sensor or a closed state in which the image sensor is shielded;
    a first charge member that charges a first drive force used to drive the first shutter blade set;
    a second charge member that charges a second drive force used to drive the second shutter blade set;
    a first cam having formed therein a first drive force charge cam face that comes in contact with the first charge member to displace the first charge member along a charging direction so as to charge the first drive force;
    a second cam having formed therein a second drive force charge cam face that comes in contact with the second charge member to displace the second charge member along the charging direction so as to charge the second drive force; and
    a third cam having formed therein a cam face so as to drive a mirror between a down position assumed within a photographic optical path in order to guide the subject image to a viewfinder and an up position assumed out of the photographic optical path to guide the subject image to the image sensor, wherein
    the first cam, the second cam, and the third cam are fixed upon a rotating shaft that causes the first cam, the second cam, and the third cam to rotate as one,
    the first cam is rotated to assume a rotational phase at which drive of the first shutter blade set with the first drive force is not hindered and the second drive force charge cam face in contact with the second charge member charges the second drive force as the rotating shaft is caused to rotate to a first rotational phase;

the second drive force charge cam in contact with the second charge member sustains a second drive force charging state during a transition period in which the rotating shaft in the first rotational phase rotates to a second rotational phase; and the first drive force charge cam face in contact with the first charge member charges the first drive force and the second drive force charge cam face in contact with the second charge member charges the second drive force as the rotating shaft is caused to rotate from the first rotational phase to the second rotational phase.

2. A camera according to claim 1, wherein:

as the rotating shaft in the first rotational phase is caused to rotate to a third rotational phase, the first cam is rotated to assume a rotational phase at which the drive of the first shutter blade set with the first drive force is not hindered and the second cam is rotated to assume a rotational phase at which drive of the second shutter blade set with the second drive force is not hindered; and during a transition period in which the rotating shaft in the third rotational phase rotates to the first rotational phase, the first cam is not rotated to a rotational phase at which the drive of the first shutter blade set with the first drive force is hindered and the second drive force charge cam face contacts the second charge member so as to gradually charge the second drive force.

3. A camera according to claim 1, wherein:

as the rotating shaft is caused to rotate to assume a fourth rotational phase, the first drive force charge cam face in contact with the first charge member charges the first drive force and the second drive force charge cam face in contact with the second charge member charges the second drive force;

during a transition period in which the rotating shaft in the fourth rotational phase rotates to a fifth rotational phase, the first drive force charge cam face moves away from the first charge member so as to allow the first charge member to move along a direction opposite from the charging direction and the second drive force charge cam face moves away from the second charge member so as to allow the second charge member to move along the direction opposite from the charging direction;

as the rotating shaft is caused to rotate to the fifth rotational phase, the first cam is rotated to assume a rotational phase at which the drive of the first shutter blade set with the first drive force is not hindered and the second cam is rotated to assume a rotational phase at which the drive of the second shutter blade set with the second drive force is not hindered; and during a transition period in which the rotating shaft in the fifth rotational phase rotates to the fourth rotational phase, the first drive force charge cam face in contact with the first charge member gradually displaces the first charge member along the charging direction and the second drive force charge cam face in contact with the second charge member gradually displaces the second charge member along the charging direction.

4. A camera comprising:

an image sensor that captures a subject image;

a first shutter blade set and a second shutter blade set that open/close to assume an open state in which the subject image is guided to the image sensor or a closed state in which the image sensor is shielded;

a first charge member that charges a first drive force used to drive the first shutter blade set;

a second charge member that charges a second drive force used to drive the second shutter blade set;

a first cam having formed therein a first drive force charge cam face that comes in contact with the first charge member to displace the first charge member along a charging direction so as to charge the first drive force;

a second cam having formed therein a second drive force charge cam face that comes in contact with the second charge member to displace the second charge member along the charging direction so as to charge the second drive force;

a third cam having formed therein a cam face so as to drive a mirror between a down position assumed within a photographic optical path in order to guide the subject image to a viewfinder and an up position assumed out of the photographic optical path to guide the subject image to the image sensor; and a rotating shaft with the first cam, the second cam and the third cam fixed thereupon, that causes the first through third cams to rotate as one, wherein the first cam is rotated to assume a rotational phase at which drive of the first shutter blade set with the first drive force is not hindered and the second drive force charge cam face in contact with the second charge member charges the second drive force as the rotating shaft is caused to rotate to a first rotational phase, the second drive force charge cam in contact with the second charge member sustains a second drive force charging state during a transition period in which the rotating shaft in the first rotational phase rotates to a second rotational phase, the first drive force charge cam face in contact with the first charge member charges the first drive force and the second drive force charge cam face in contact with the second charge member charges the second drive force as the rotating shaft is caused to rotate from the first rotational phase to the second rotational phase, as the rotating shaft in the first rotational phase is caused to rotate to a third rotational phase, the first cam is rotated to assume a rotational phase at which the drive of the first shutter blade set with the first drive force is not hindered and the second cam is rotated to assume a rotational phase at which drive of the second shutter blade set with the second drive force is not hindered, during a transition period in which the rotating shaft in the third rotational phase rotates to the first rotational phase, the first cam is not rotated to a rotational phase at which the drive of the first shutter blade set with the first drive force is hindered and the second drive force charge cam face contacts the second charge member so as to gradually charge the second drive force, as the rotating shaft is caused to rotate to a fourth rotational phase, the first drive force charge cam face in contact with the first charge member charges the first drive force and the second drive force charge cam face in contact with the second charge member charges the second drive force, during a transition period in which the rotating shaft in the fourth rotational phase rotates to a fifth rotational phase, the first drive force charge cam face moves away from the first charge member so as to allow the first charge member to move along a direction opposite from the charging direction and the second drive force charge cam face moves away from the second charge member so as to allow the second charge member to move along the direction opposite from the charging direction, as the rotating shaft is caused to rotate to the fifth rotational phase, the first cam is rotated to assume a rotational phase at which the drive of the first shutter blade set with the first drive force is not hindered and the second cam is rotated to assume a rotational phase at which the drive of the second shutter blade set with the second drive force is not hindered, during a transition period in which the rotating shaft in the fifth rotational phase rotates to the fourth rotational phase, the first drive force charge cam face in contact with the first charge member gradually displaces the first charge member along the charging direction and the second drive force charge cam face in contact with the second charge member gradually displaces the second charge member along the charging direction, and the fifth rotational phase is equivalent to the third rotational phase.

5. A camera according to claim 1, wherein:

the second rotational phase includes a sixth rotational phase and a seventh rotational phase;

during a transition period in which the rotating shaft in the sixth rotational phase rotates to the seventh rotational phase, the third cam drives the mirror in the down position to the up position;

during a transition period in which the rotating shaft in the seventh rotational phase rotates to the sixth rotational phase, the third cam drives the mirror assuming the up position to the down position;

as the rotating shaft is caused to rotate to the sixth rotational phase, the third cam is rotated to assume a rotational phase at which the mirror is set in the down position; and as the rotating shaft is caused to rotate to the seventh rotational phase, the third cam is rotated to assume a rotational phase at which the mirror is set in the up position.

6. A camera according to claim 3, further comprising:

a first holding device that includes a first coil and holds the first shutter blade set charged with the first drive force so as to disallow drive of the first shutter blade set with the first drive force as power is supplied to the first coil;

a second holding device that includes a second coil and holds the second shutter blade set charged with the second drive force so as to disallow drive of the second shutter blade set with the second drive force as power is supplied to the second coil; and a coil control device that controls power supply to the first coil and power supply to the second coil, wherein:

during the transition period in which the rotating shaft in the fourth rotational phase rotates to the fifth rotational phase, the coil control device supplies power to the first coil so as to ensure the first shutter blade set is not driven with the first drive force and supplies power to the second coil so as to ensure that the second shutter blade set is not driven with the second drive force.

7. A camera according to claim 6, wherein:

when the rotating shaft is caused to rotate to the first rotational phase, the coil control device does not supply power to the first coil or the second coil.

8. A camera according to claim 2, further comprising:

an imaging control device that controls an imaging operation executed by the image sensor to capture a subject image, wherein:

the imaging control device enables the image sensor to capture a subject image as the rotating shaft rotates to the third rotational phase.

9. A camera comprising:

an image sensor that captures a subject image;

an imaging control device that controls an imaging operation executed by the image sensor to capture the subject image;

a first shutter blade set and a second shutter blade set that open/close to assume an open state in which the subject image is guided to the image sensor or a closed state in which the image sensor is shielded;

a first charge member that charges a first drive force used to drive the first shutter blade set;

a second charge member that charges a second drive force used to drive the second shutter blade set;

a first cam having formed therein a first drive force charge cam face that comes in contact with the first charge member to displace the first charge member along a charging direction so as to charge the first drive force;

a second cam having formed therein a second drive force charge cam face that comes in contact with the second charge member to displace the second charge member along the charging direction so as to charge the second drive force;

a third cam having formed therein a cam face so as to drive a mirror between a down position assumed within a photographic optical path in order to guide the subject image to a viewfinder and an up position assumed out of the photographic optical path to guide the subject image to the image sensor; and a rotating shaft with the first cam, the second cam and the third cam fixed thereupon, that causes the first through third cams to rotate as one, wherein the first cam is rotated to assume a rotational phase at which drive of the first shutter blade set with the first drive force is not hindered and the second drive force charge cam face in contact with the second charge member charges the second drive force as the rotating shaft is caused to rotate to a first rotational phase, the second drive force charge cam in contact with the second charge member sustains a second drive force charging state during a transition period in which the rotating shaft in the first rotational phase rotates to a second rotational phase, the first drive force charge cam face in contact with the first charge member charges the first drive force and the second drive force charge cam face in contact with the second charge member charges the second drive force as the rotating shaft is caused to rotate from the first rotational phase to the second rotational phase, as the rotating shaft is caused to rotate to assume a fourth rotational phase, the first drive force charge cam face in contact with the first charge member charges the first drive force and the second drive force charge cam face in contact with the second charge member charges the second drive force, during a transition period in which the rotating shaft in the fourth rotational phase rotates to a fifth rotational phase, the first drive force charge cam face moves away from the first charge member so as to allow the first charge member to move along a direction opposite from the charging direction and the second drive force charge cam face moves away from the second charge member so as to allow the second charge member to move along the direction opposite from the charging direction, as the rotating shaft is caused to rotate to the fifth rotational phase, the first cam is rotated to assume a rotational phase at which the drive of the first shutter blade set with the first drive force is not hindered and the second cam is rotated to assume a rotational phase at which the drive of the second shutter blade set with the second drive force is not hindered, during a transition period in which the rotating shaft in the fifth rotational phase rotates to the fourth rotational phase, the first drive force charge cam face in contact with the first charge member gradually displaces the first charge member along the charging direction and the second drive force charge cam face in contact with the second charge member gradually displaces the second charge member along the charging direction, and the imaging control device enables the image sensor to capture the subject image as the rotating shaft rotates to the fifth rotational phase.

* * * * *